US012811376B2

(12) United States Patent
Young et al.

(10) Patent No.: US 12,811,376 B2
(45) Date of Patent: Nov. 24, 2026

(54) CABLE TRAY EXIT AND ACCESSORIES

(71) Applicant: ERICO International Corporation, Solon, OH (US)

(72) Inventors: Dennis R. Young, Amherst, OH (US); Tom M. Colangelo, Lombard, IL (US); Lauren Novak, Solon, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 18/820,707

(22) Filed: Aug. 30, 2024

(65) Prior Publication Data

US 2025/0079815 A1 Mar. 6, 2025

Related U.S. Application Data

(60) Provisional application No. 63/580,028, filed on Sep. 1, 2023.

(51) Int. Cl.
*H02G 3/04* (2006.01)
*F16L 3/26* (2006.01)

(52) U.S. Cl.
CPC .............. *H02G 3/0456* (2013.01); *F16L 3/26* (2013.01); *H02G 3/0406* (2013.01)

(58) Field of Classification Search
CPC .. H02G 3/0456; H02G 3/0406; H02G 3/0443; H02G 3/0608; H02G 3/06; H02G 3/263; H02G 3/36; H02G 7/05; H02G 3/045; F16L 3/26
USPC ............................................................ 248/49
See application file for complete search history.

(56) References Cited

U.S. PATENT DOCUMENTS

| | | | | | |
|---|---|---|---|---|---|
| 2,656,998 | A * | 10/1953 | Ullberg, Jr. ............ | H02G 3/045 193/41 |
| 2,662,709 | A * | 12/1953 | Ullberg, Jr. .......... | H02G 3/0608 248/68.1 |
| 5,384,937 | A | 1/1995 | Simon | |
| 5,663,527 | A * | 9/1997 | Hui ........................ | H02G 3/263 174/101 |
| 6,522,823 | B1 | 2/2003 | Wentworth et al. | |
| 6,546,179 | B2 | 4/2003 | Petri | |
| 6,586,680 | B1 | 7/2003 | Nelson | |
| 6,633,718 | B1 | 10/2003 | Thom | |

(Continued)

FOREIGN PATENT DOCUMENTS

| | | | |
|---|---|---|---|
| CA | 2406555 | A1 | 4/2004 |
| CN | 205231646 | U | 5/2016 |

(Continued)

OTHER PUBLICATIONS

EP Search Report from EP 24197855.0 dated Jan. 28, 2025, 11 pages.

(Continued)

*Primary Examiner* — Christopher Garft
(74) *Attorney, Agent, or Firm* — Quarles & Brady LLP

(57) ABSTRACT

A system and method are disclosed for supporting cables, including on first and second cable trays formed from wires. An exit adapter can include a ramp to route cables. An exit bracket can include a bracket channel. The exit adapter can be secured to the first cable tray with the exit bracket secured to the exit adapter, and the bracket channel receiving a transverse wire of the floor of the second cable tray to hang the second cable tray.

18 Claims, 21 Drawing Sheets

(56) References Cited

U.S. PATENT DOCUMENTS

| | | | |
|---|---|---|---|
| 6,763,169 B2 | 7/2004 | Wentworth et al. | |
| 6,855,884 B2 | 2/2005 | Spagnoli et al. | |
| 7,463,812 B2 | 12/2008 | Coburn et al. | |
| 7,476,801 B1 | 1/2009 | Davis et al. | |
| 7,546,987 B2 | 6/2009 | Sinkoff | |
| 7,601,922 B2 | 10/2009 | Larsen et al. | |
| 7,608,786 B2 | 10/2009 | Deciry et al. | |
| 7,825,342 B2 | 11/2010 | Caveney | |
| 7,954,287 B2 | 6/2011 | Bravo et al. | |
| 7,954,776 B2 | 6/2011 | Davis et al. | |
| 8,106,311 B2 | 1/2012 | Larsen et al. | |
| 8,263,863 B2 | 9/2012 | Young | |
| 8,315,069 B2 | 11/2012 | Caveney | |
| 8,502,071 B2 | 8/2013 | Caveney et al. | |
| 8,965,169 B2 | 2/2015 | Haataja et al. | |
| 9,466,959 B2 | 10/2016 | Larsen et al. | |
| 9,784,938 B2 | 10/2017 | Kellerman | |
| 9,935,446 B2 | 4/2018 | Kellerman | |
| 9,939,102 B2 | 4/2018 | Kellerman | |
| 9,958,090 B2 | 5/2018 | Kellerman | |
| 10,209,472 B2 | 2/2019 | Estrada Gonzalez et al. | |
| 10,433,658 B1 | 10/2019 | Kologe | |
| 11,283,250 B2 | 3/2022 | Kellerman et al. | |
| 2003/0116682 A1 | 6/2003 | Finco et al. | |
| 2004/0065459 A1 | 4/2004 | Spagnoli et al. | |
| 2004/0231874 A1 | 11/2004 | Caveney et al. | |
| 2005/0063775 A1 | 3/2005 | Boltz | |
| 2010/0038496 A1 | 2/2010 | Sjoqvist | |
| 2011/0286785 A1 | 11/2011 | Brouwer et al. | |
| 2012/0211609 A1 | 8/2012 | Mandic | |
| 2014/0341523 A1 | 11/2014 | Waite et al. | |
| 2015/0380918 A1 | 12/2015 | Kellerman | |
| 2016/0197464 A1* | 7/2016 | Kellerman | F16M 13/02 248/68.1 |
| 2016/0308339 A1* | 10/2016 | Kellerman | F16L 3/22 |
| 2017/0250529 A1* | 8/2017 | Kellerman | F16L 3/2235 |
| 2022/0224090 A1* | 7/2022 | Sledzinski | H02G 3/0443 |
| 2022/0269026 A1* | 8/2022 | Arvilla | H02G 3/045 |

FOREIGN PATENT DOCUMENTS

| | | |
|---|---|---|
| CN | 107046258 A | 8/2017 |
| CN | 109075545 A | 12/2018 |
| CN | 215498051 U | 1/2022 |
| CN | 218070896 U | 12/2022 |
| DE | 3742448 A1 | 6/1989 |
| DE | 202012010205 U1 | 11/2012 |
| EP | 1206022 A1 | 5/2002 |
| GB | 2467030 B | 6/2012 |
| JP | 05588799 B2 | 9/2014 |
| KR | 200476352 Y1 | 3/2015 |
| KR | 101738450 B1 | 5/2017 |
| KR | 101836393 B1 | 3/2018 |
| WO | 199740564 A1 | 10/1997 |
| WO | 2004003617 A1 | 1/2004 |
| WO | 2012168655 A1 | 12/2012 |
| WO | 2015200910 A1 | 12/2015 |
| WO | 2016099309 A1 | 6/2016 |
| WO | 2017156537 A1 | 9/2017 |

OTHER PUBLICATIONS

Anonymous: "Spider Bracket for SRWB Wire Basket Cable Trays Model : SRWBSPDRBRKT", Aug. 29, 2019, pp. 1-8, retrieved from internet, https://tripplite.eaton.com/wall-floor-spider-bracket-for-wire-mesh-cable-trays-SRWBSPDRBRKT [retrieved on Jan. 27, 2025].

Legreans A: "Catalog 2016 2017 CABLOFIL Cable Management PW Ladder Tray Trough Trays Fiber Trough & V-Trough FAsteners J-Hooks, FAS Power Brackets & CablePort", Jan. 1, 2016, pp. 1-288, retrieved from internet: https://contactfd.com/wp-content/uploads/Catalog-Cablofil-2016-2017.pdf, [retrieved on Jun. 14, 2022].

Cable Exit Clip/Dropout Waterfall for Wire Mesh Cable Trays, 45 mm Wide, https://tripplite.eaton.com/cable-exit-clip-dropout-waterfall-for-wire-mesh-cable-trays-45mm~SRWBDROP, printed Feb. 4, 2025, 8 pages.

Toolless Movable Waterfall Adapter Kit for Fiber Routing System, 130 mm, https://tripplite.eaton.com/waterfall-adapter-for-fiber-routing-system-130-mm~SRFC4WTRFL, printed Feb. 4, 2025, 8 pages.

Cable Drop Out Kit, https://umevn.vn/en/san-pham/cable-drop-out-kit-3/, printed Feb. 4, 2025, 2 pages.

Legrand expands Cablofil systems for seamless data center cable dropouts, https://www.cablinginstall.com/data-center/article/14289068/legrand-expands-cablofil-systems-for-seamless-data-center-cable-dropouts, printed Feb. 4, 2025, 9 pages.

Cable Exit (CABLEXIT50PL), https://umevn.vn/en/san-pham/cable-exit-cablexit50pl-2/, printed Feb. 4, 2025, 3 pages.

Eaton B-Line Series Redi-Rail Runway Dropout Kit, https://www.eaton.com/us/en-US/skuPage.SB13ALDO18EW.html#tab-3, printed Feb. 4, 2025, 2 pages.

* cited by examiner

CABLE TRAY EXIT AND ACCESSORIES

CROSS-REFERENCE TO RELATED APPLICATIONS

This application claims priority to U.S. Provisional Patent Application No. 63/580,028, filed Sep. 1, 2023, the entirety of which is incorporated herein by reference.

BACKGROUND

Cable trays can be used to support cables for data or power transmission in a variety of settings. Cable trays generally include a floor and sides, typically with a generally U-shaped cross-section. Some cable trays are formed from grids of wires, with a pattern of longitudinal and lateral wires extending along and transverse to an elongate direction of the cable tray, respectively, to form a horizontal floor and vertical sides. Large numbers of cables can be supported by cable tray along any variety of distances, with bundles of cables entering or exiting the cable tray at various locations for routing of power or other signals to or from various components.

SUMMARY

Some embodiments of the disclosure provide a system for supporting cables. The system can include a first cable tray and a second cable tray, an exit adapter having a first end and a second end, and an exit bracket having a top end and a bottom end. Each of the first and second cable trays can include floor and side walls formed from longitudinal and transverse wires. The exit adapter can include a ramp that extends between the first end and the second end and a first mating tab at the first end. The exit bracket can include a bracket channel that opens upwardly, and a mating flange. The exit adapter can be securable to the first cable tray in a first orientation, with the first end below the second end, the mating flange of the exit bracket secured to the first mating tab of the exit adapter, and the bracket channel receiving a transverse wire of the floor of the second cable tray to hang the second cable tray from the first end of the exit adapter.

In some embodiments, the exit adapter can include a second mating tab at the second end. The exit bracket can be securable to the first cable tray in a second orientation, with the second end below the first end, the mating flange of the exit bracket secured to the second mating tab of the exit adapter, and the bracket channel receiving the transverse wire of the floor of the second cable tray to hang the second cable tray from the second end of the exit adapter.

In some embodiments, the first mating tab includes a notch, the matching flange can include a hook, and with the exit adapter in the first orientation, the hook can be received into the notch to support the exit bracket vertically relative to the exit adapter.

In some embodiments, the bracket channel can receive transverse wires of the side walls of the second cable tray. In some embodiments, the bracket channel can be discontinuous to receive longitudinal wires of the side walls of the second cable tray. In some embodiments, the exit bracket can include a first wall, a second wall, and a third wall that can collectively define the bracket channel. In some embodiments, the first wall can include a first lip and the bottom end of the exit bracket, the second wall can include a second lip and the bottom end of the exit bracket, and the third wall can include a third lip at the bottom end of the exit bracket. The exit bracket channel can be collectively defined by the first, second, and third lips.

In some embodiments, the top end of the exit bracket can include a furled edge that extends above the bracket channel and aligns with the ramp at the first end of the exit adapter. In some embodiments, the mating flange can extend from the furled edge.

In some embodiments, the system can include a guard that can include an outer wall defining a cavity. The guard can receive a transverse wire of a first side wall of the side walls of the first cable tray at a cut section of the first cable tray.

Some embodiments of the disclosure provide a bracket for hanging a cable tray section of a cable tray system. The bracket can include a wall structure that can extend between a top end of the bracket and a bottom end of the bracket to define a cable passage between the top and bottom ends of the bracket, a flange that can extend from the wall structure at the top end of the bracket, to hang the bracket from an exit adapter of the cable tray system, and a lip that can extend from the wall structure to define a channel that opens toward the top end of the bracket to receive a horizontal wire of the cable tray section, to support the received horizontal wire relative to the exit adapter via the wall structure and the flange.

In some embodiments, a plurality of voids can be spaced along the lip to receive vertically oriented wires of the cable tray section that extend from the received horizontal wire. In some embodiments, the plurality of voids can define tabs along the lip and at least two of the tabs can include an aperture. The wall structure can include at least two apertures aligned with the apertures in the at least two tabs to receive fasteners therethrough, to retain the received horizontal wire within the channel.

In some embodiments, flanges can extend from a furled upper edge of the wall structure. In some embodiments, the flange can include a hooked free end to engage the exit adapter.

In some embodiments, the wall structure can include a top edge that can extend outwardly, away from the cable passage, above the channel. In some embodiments, the wall structure can define a U-shaped profile of the cable passage.

Some embodiments of the disclosure provide a method of supporting cable trays. The method can include securing an exit adapter to a first cable tray that can include floor and side walls formed from longitudinal and transverse wires, with a ramp of the exit adapter extending between a first end and a second end of the exit adapter to route cable off of or onto the first cable tray and supporting a second cable tray by the first cable tray via the exit adapter. Supporting the second cable tray by the first cable tray via the exit adapter can include securing an exit bracket to the first cable tray via the exit adapter, with a bracket channel of the exit adapter opening upwardly toward the first cable tray and hanging the second cable tray from the exit bracket with a transverse wire of the second cable tray received into the bracket channel.

In some embodiments, securing the exit adapter to the first cable tray can include selectively securing the exit adapter in either of a first orientation and a second orientation. In the first orientation, the first end of the exit adapter is below the second end, wherein securing the exit bracket to the first cable tray via the exit adapter includes securing the exit bracket to the first end of the exit adapter. In the second orientation, the second end of the exit adapter is below the first end, wherein securing the exit bracket to the first cable tray via the exit adapter includes securing the exit bracket to the second end of the exit adapter. In some embodiments, securing the exit bracket to the first end of the exit adapter can include securing a mating flange of the exit bracket to a first mating tab at the first end of the exit adapter. Securing the exit bracket to the second end of the exit adapter can include securing the mating flange of the exit bracket to a second mating tab at the second end of the exit adapter.

Some embodiments of the disclosure provide an exit bracket for coupling a discrete cable tray section to an exit adapter that is attached to a cable tray. The exit bracket can include a wall configured to be attachable to the exit adapter and a lip that can curve outwardly away from the wall, to extend alongside and spaced from the wall to define a channel between the wall and the lip. The channel can be configured to receive a horizontal wire (e.g., longitudinal wires) of the discrete cable tray section. The lip can include a plurality of voids spaced there along, which can be configured to receive vertically oriented wires of the discrete cable tray section therein.

Other embodiments of the disclosure can provide an exit bracket for coupling a discrete cable tray section to an exit adapter that is attached to a cable tray. The exit bracket can include a first section, a second section, and a third section integrally formed. The second and third sections can extend from opposite ends of the first section. Each of the first, second, and third sections can include a wall configured to be attachable to the exit adapter; a lip that first curves outwardly away from, then alongside and spaced from, the wall; and a channel defined by and between the wall and the lip. The channel in the first section can be configured to receive a longitudinal wire of a floor of the discrete cable tray section. The channels of the second and third sections can be configured to receive longitudinal wires of opposing side walls of the discrete cable tray section. The lip of the first section can include a plurality of voids spaced there along, which can be configured to receive vertically oriented wires of the floor of the discrete cable tray section. The lips of the second and third sections can respectively include a void spaced there along and can be configured to receive a vertically oriented wire of the opposing side walls of the discrete cable tray section therein.

Some embodiments of the disclosure can provide a guard for covering cut ends of a cable tray. The guard can include an outer wall defining a cavity and a set of snaps positioned within the cavity. The set of snaps can be configured to retain a vertical wire of a side wall of the cable tray.

Some embodiments of the disclosure can provide a system for supporting cables. A first cable tray and a second cable tray can include a floor and side walls formed from longitudinal and transverse wires. An exit adapter can have a first end and a second end and can include a ramp extending between the first end and the second end and a first mating tab at the first end. An exit bracket can have a top end and a bottom end and can include a bracket channel that opens upwardly and a mating flange. The exit adapter can be secured to the first cable tray in a first orientation, with the first end below the second end, the mating flange of the exit bracket secured to the first mating tab of the exit adapter, and the bracket channel receiving a transverse wire of the floor of the second cable tray to hang the second cable tray from the first end of exit adapter.

Some embodiments of the disclosure can provide a bracket for hanging a cable tray section of a cable tray system. The bracket can include a wall structure extending between a top end of the bracket and a bottom end of the bracket to define a cable passage between the top and bottom ends of the bracket. A flange can extend from the wall structure at the top end of the bracket, to hang the bracket from an exit adapter of the cable tray system. A lip can extend from the wall structure to define a channel that opens toward the top end of the bracket to receive a horizontal wire of the cable tray section, to support the received horizontal wire relative to the exit adapter via the wall structure and the flange.

Some embodiments of the disclosure can provide a method of supporting cable trays. An exit adapter can be secured to a first cable tray that includes a floor and side walls formed from longitudinal and transverse wires. A ramp of the exit adapter can extend between a first end and a second end of the exit adapter to route cable off of or onto the first cable tray. A second cable tray can be \supported by the first cable tray via the exit adapter. An exit bracket can be secured to the first cable tray via the exit adapter, with a bracket channel of the exit adapter opening upwardly toward the first cable tray. The second cable tray can be hung from the exit bracket with a transverse wire of the second cable tray received into the bracket channel.

BRIEF DESCRIPTION OF THE DRAWINGS

The accompanying drawings, which are incorporated in and form a part of this specification, illustrate embodiments of the disclosure and, together with the description, serve to explain the principles of embodiments of the disclosure.

DETAILED DESCRIPTION

Figure 1A:
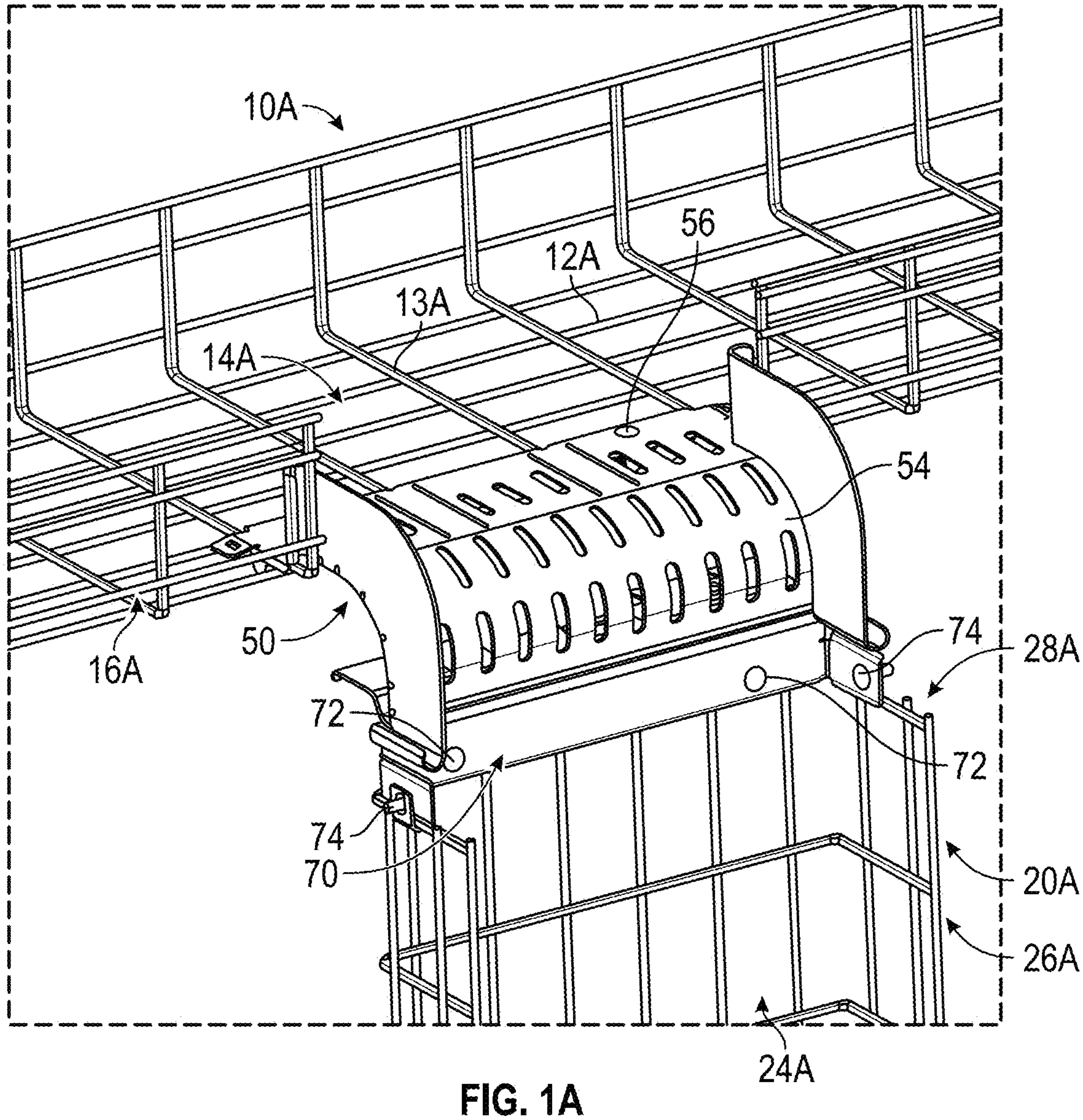
FIG. 1A is an isometric view of a tray system that includes an exit bracket and an exit adapter in a first orientation, according to an embodiment of the disclosure.

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosure. Various modifications to the illustrated embodiments will be readily apparent to those skilled in the art, and the generic principles herein can be applied to other embodiments and applications without departing from embodiments of the disclosure. Thus, embodiments of the disclosure are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosure. Skilled artisans will recognize the examples provided herein have many useful alternatives and fall within the scope of embodiments of the disclosure.

In various installations, electrical or datacom cables can be routed along cable trays that are mounted to overhead structures (e.g., suspended from ceiling structures by threaded rods). Some cable trays are formed as wire baskets, with a lattice of wires that form a floor to support cables and sides that extend from the floor to contain the cables or generally provide improved strength for the cable tray. For example, longitudinal wires can extend along an elongate direction of a cable tray section, and can be joined together by lateral wires that extend transversely across the longitudinal wires. In some examples, cable trays can exhibit U-shaped cross-sectional profiles, including with sides that extend perpendicularly to a floor (e.g., vertically upward from a horizontal floor).

To route cables onto or off of a floor of cable tray, it may thus be necessary for the cables to be passed over or through sides of the cable tray. For example, to reach a server cabinet or other relevant system, cables may need to pass up and over a side of an unmodified wire trays (i.e., a tray with continuous longitudinal wires along a relevant section of a side of the cable tray). In contrast, cables may need to pass through a cut section of a side of a modified wire tray (i.e., a tray with longitudinal wires along a side of the cable tray that are cut to provide an opening for the cables to pass through). Generally, various types of exit adapters (or cable exits) can be selectively installed on cable trays to help route and protect cables passing onto or off of a cable tray.

For example, some exit adapters can include a ramp and side walls connected to the ramp to define a cable path along the ramp, between first and second ends thereof. Support tabs can extend from the first and second ends of the exit adapter (e.g., outwardly from the ramp) adjacent to the first and second ends of the ramp to engage wires of a cable tray to secure the exit adapter to the cable tray in a first orientation (e.g., first configuration) and a second orientation (e.g., second configuration). In the first orientation, for example, the ramp can be aligned to guide cables through a cut section of a side wall of a modified cable tray (e.g., with one or more first tabs engaged with one more wires of a floor of the cable tray). In contrast, in the second orientation, the ramp can be aligned to guide cables over the top of a side of an unmodified cable tray (e.g., with one or more second tabs engaging one or more wires of the side of the cable tray). In other examples, however, other types of exit adapters are possible, including various ramp (or other) exits of generally known types. Or, in other configurations, an exit adapter may be configured for installation in only one orientation, with support structures other than tabs, etc.

To continue a cable pathway beyond the exit adapter, an installer may be required to secure a vertically oriented cable tray section to the exit adapter with a makeshift connections onsite. This type of ad-hoc installation method can lead to inconsistent installations and increase the potential for sharp edges of the cable tray wires of the vertical section or the fasteners used to connect the vertical section to the exit adapter to be exposed and pose a damage hazard to the cables within the tray.

Further, in installation configurations in which the side wall of the cable tray is cut and removed, the side wall of the cable tray may be larger than the side wall of the exit adapter, leaving exposed cut ends of the cable tray side wall. The exposed cut ends can damage the cables within the cable tray or exiting the cable tray at the exit adapter. The disclosed technology can address these or other issues.

For example, some configurations can include an exit bracket configured to mount to an exit adapter (e.g., whether the exit adapter is in the first or second orientation) and including features designed to accept and retain a vertically supported cable tray section. In some configurations, the exit bracket can be secured to the exit adapter with fasteners. In some embodiments, a centering tab can be provided on the exit bracket to make it easier to locate the exit bracket on the exit adapter. The exit bracket can also have a channel sized and shaped to receive a horizontally oriented (or, generally, transverse) wire of the vertically oriented cable section and voids or cutouts within the channel for accepting vertically oriented (or, generally, longitudinal) wires of the cable section. Thus, an exit adapter can be easily and securely configured to support, relative to an overhead cable tray to which the exit adapter is attached, a suspended cable tray that extends downwardly from the overhead cable tray.

In some examples, there can be a number of places along the channel that can receive a bolt that, once installed, can prevent the cable tray section from exiting the channel. In some embodiments, the exposed edges of the exit bracket are furled away from the attached vertically oriented cable tray section to reduce the chance of contact with and damage to the cables running along the section.

Additionally (or alternatively), in the instances in which an installer modifies the cable tray (e.g., cuts the side wall of the cable tray), sharp edges on the cut ends of the wires of the cable tray will remain exposed after the exit adapter is selectively installed. Thus, a guard can be installed to cover the cut ends to prevent damage to cables or wires laid within the cable tray. For example, there are various heights of cable tray side walls (e.g., 2 in., 4 in., 6 in., and 8 in.) and the side wall of the exit adapter may be only tall enough to cover the cut ends of a 2-inch-tall cable tray side wall. Therefore, a guard according to the disclosure can be installed to cover the exposed cut ends of cable tray side walls of various heights. In some examples, a guard may be particularly useful in combination with an exit adapter and exit bracket (e.g., as discussed above), given the corresponding possibility that cables that may thus be routed around potentially-damaging cut edges of an overhead tray.

In some examples, a guard can have internal snaps that can clip onto the vertical wire of the cable tray side wall at the location of the cut. The snaps can be spaced (i.e., not continuous) to not interfere with the longitudinal wires of the cable tray side wall along the vertical direction. In some embodiments, a space can be provided between the snaps and each of the outer walls of the guard to provide sufficient clearance so as not interfere with (and also capture) the cut longitudinal wires, whether placed on either side of the side wall cut or corresponding cable tray exit.

Although particular lattice patterns, wire spacings, and wire cross-sections are illustrated in the various figures with respect to the exit bracket and the guard, the principles disclosed herein are not limited to those particular patterns, spacings, or cross-sections. Rather, the principles of the disclosed technology can be implemented with appropriate variation according to mechanical principles. For example, pattern, spacing, size, or shape of channels, snaps, or other features that engage wires of a tray, to secure the exit bracket to the tray, can be varied as appropriate to correspond to a particular pattern, spacing, or cross-section of wires of a cable tray.

Figure 1B:
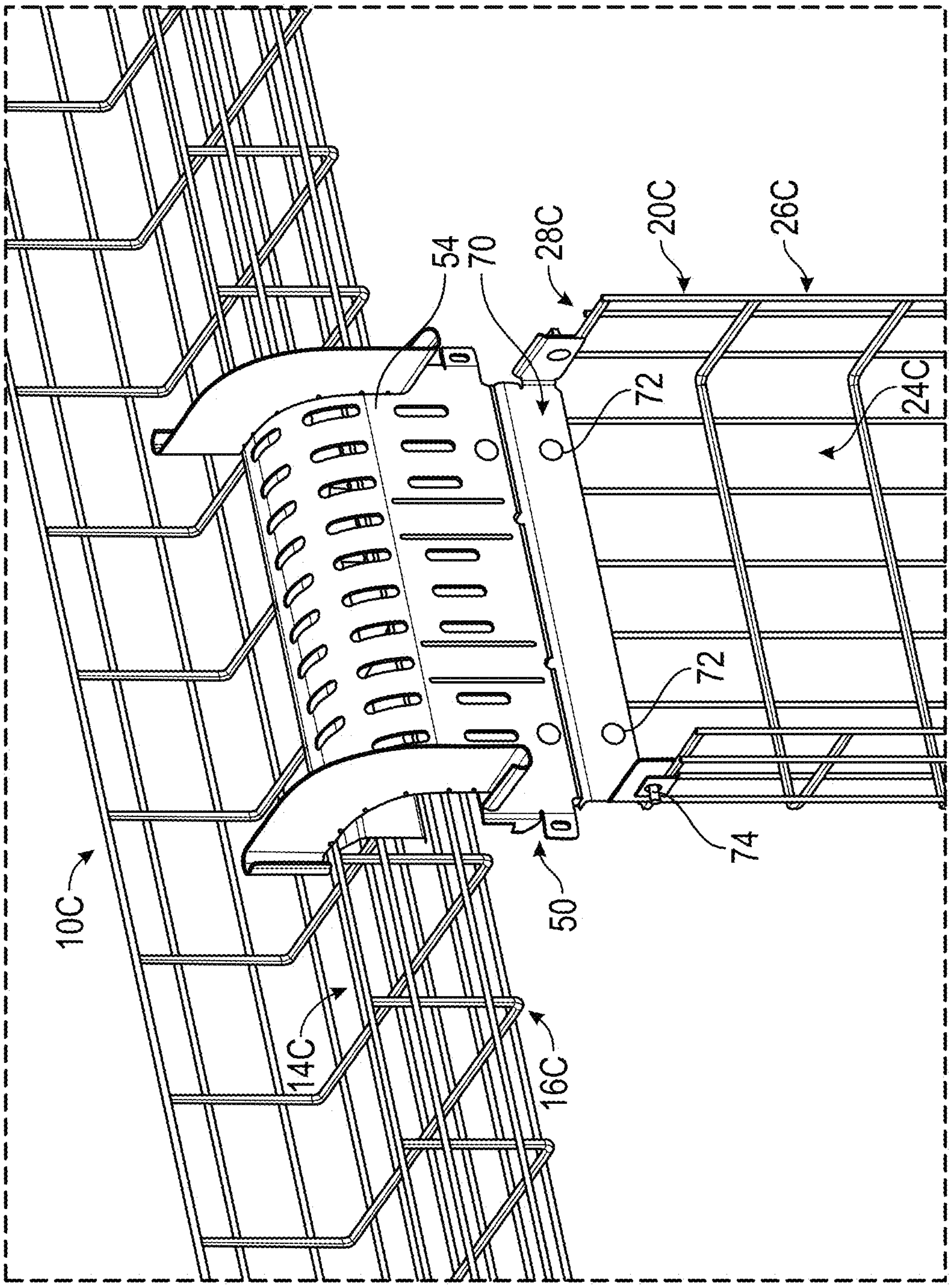
FIG. 1B is an isometric view of a tray system that includes the exit bracket and the exit adapter of FIG. 1A in a second orientation, according to an embodiment of the disclosure.
Figure 2A:
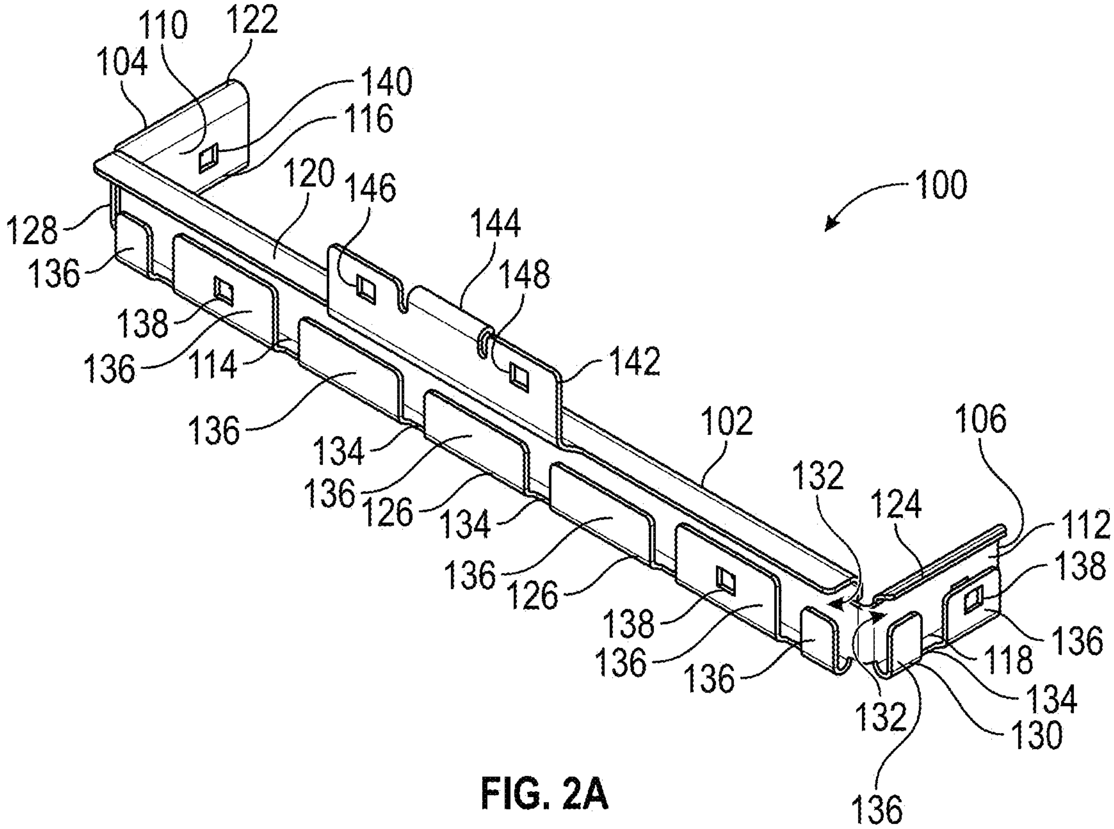
FIG. 2A is a front right top isometric of an exit bracket according to an embodiment of the disclosure.
Figure 2B:
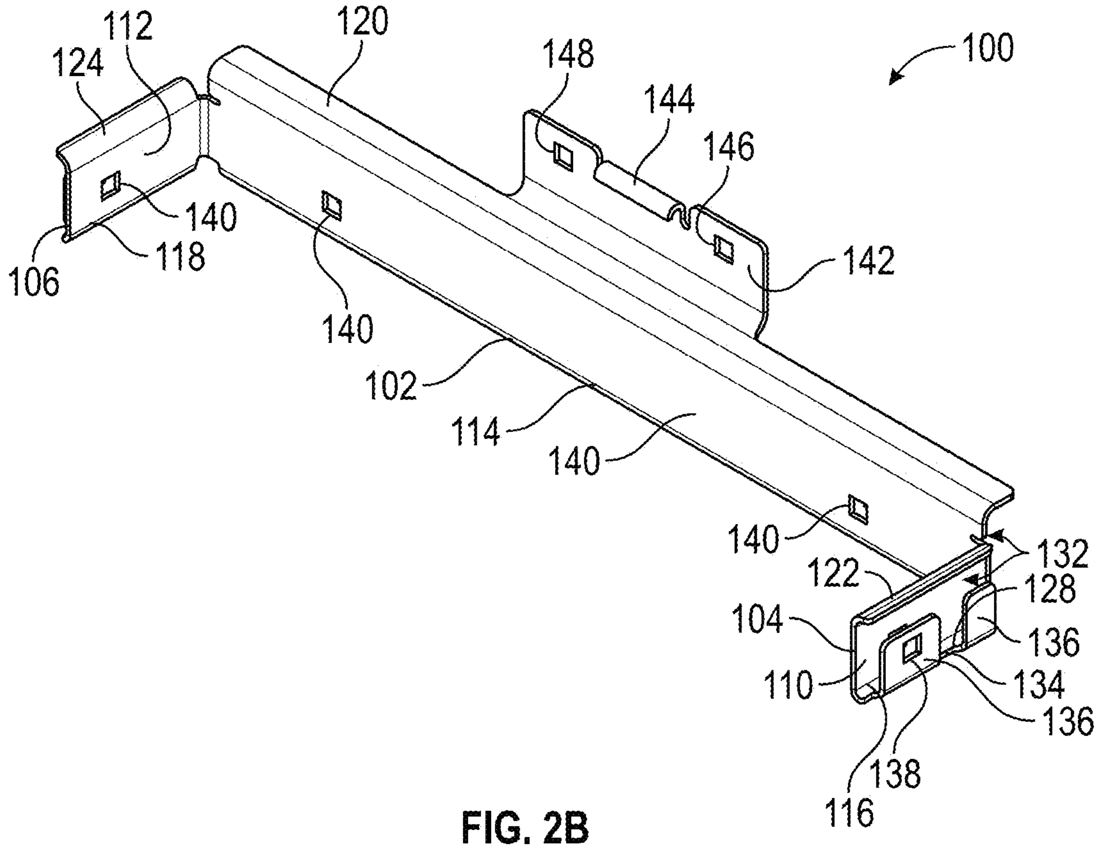
FIG. 2B is a rear left top isometric view of the exit bracket of FIG. 2A.
Figure 3:
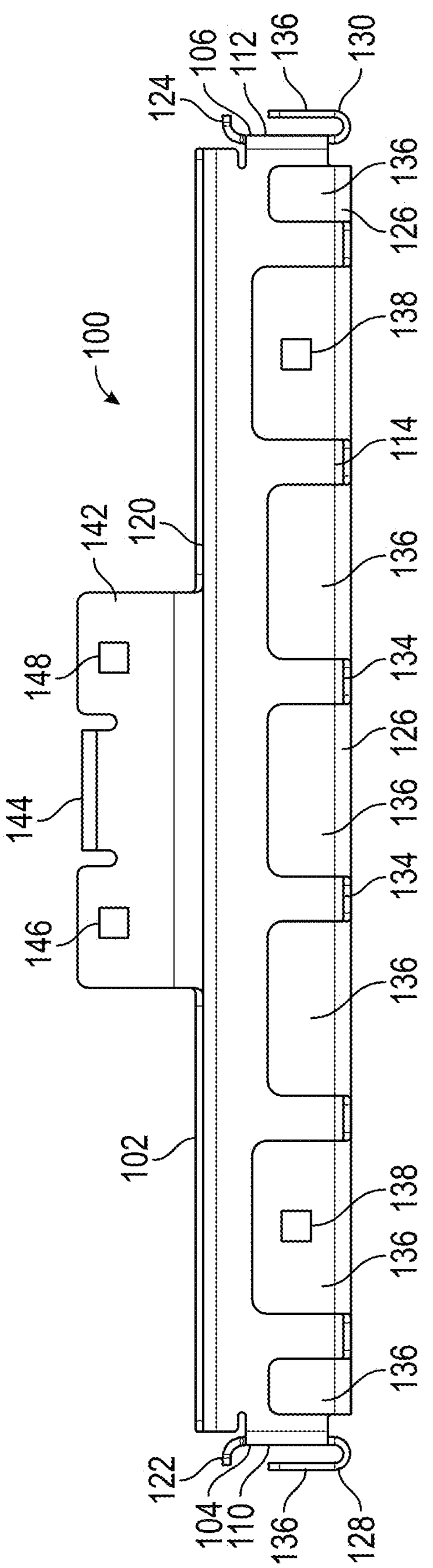
FIG. 3 is a front elevation view of the exit bracket of FIG. 2A.
Figure 4:
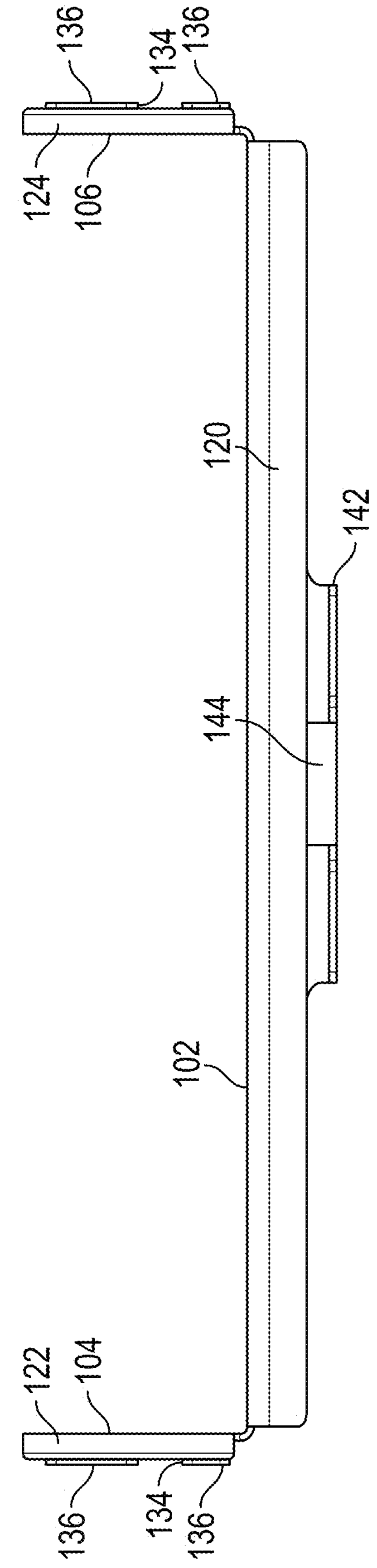
FIG. 4 is a top plan view of the exit bracket of FIG. 2A.
Figure 5:
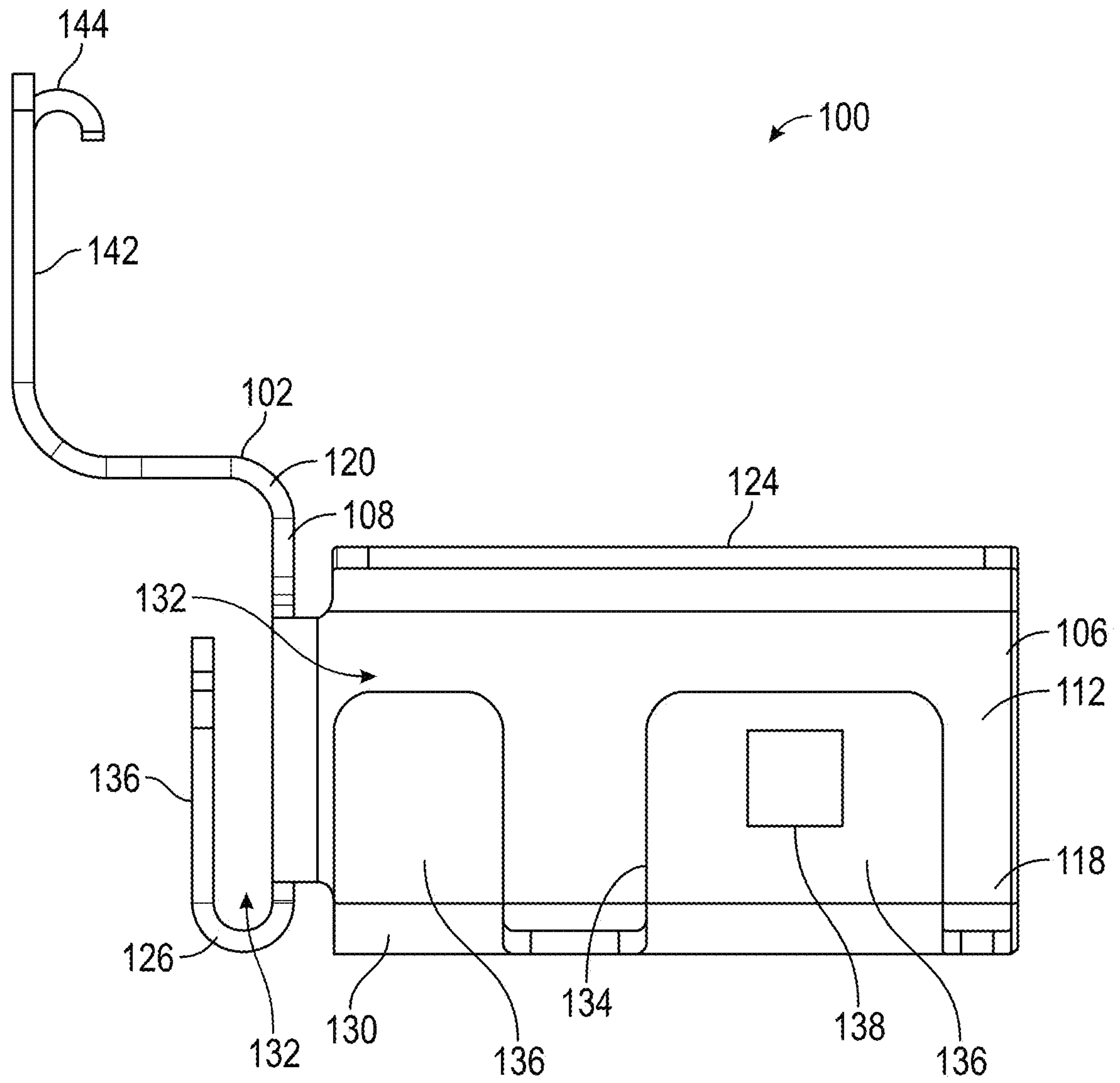
FIG. 5 is a right side elevation view of the exit bracket of FIG. 2A.

FIGS. 1A and 1B illustrate an exit bracket 70 with an exit adapter 50 selectively installed in various orientations to provide support for an assembly of cable trays.

As discussed above, the exit adapter 50 may be selectively installed in a first orientation or a second orientation. In the first orientation, as shown in FIG. 1A, a ramp 54 of the exit adapter 50 can be aligned to guide cables off of or onto a cable tray 10A (e.g., a first cable tray). In particular, the cable tray 10A in FIG. 1A is a modified cable tray 10A, and the exit adapter 50 is secured to extend through a cut section of a side wall of the exit adapter 50.

As illustrated, the exit adapter 50 and exit bracket 70 may collectively support a cable tray 20A (e.g., a second cable tray) relative to the modified cable tray 10A. As shown in FIG. 1A, the cable tray 20A may be an unmodified cable tray oriented with a floor 24A of the cable tray 20A substantially perpendicular to a floor 14A of the cable tray 10A. In some such embodiments, cables (not shown) may be guided through a side wall 16A of the modified cable tray 10A, along the ramp 54 of the exit adapter 50, through a cable passage defined by the exit bracket 70, and onto the cable tray 20A via an end 28A of the cable tray 20A.

Generally, a suspended cable tray may thus be hung from a bracket (e.g., via a bracket channel as discussed below), and the bracket may be hung from an exit adapter. Correspondingly, the exit adapter may support the suspended cable tray, via the bracket, relative to a cable tray to which the exit adapter is attached. In some examples, the exit adapter 50 may be secured to the cable tray 10A via a fastener 56, as shown in FIG. 1A. Similarly, the exit bracket 70 may be secured to the floor 24A via fasteners 72 or secured to the end 28A of a side wall 26A of the cable tray 20A via fasteners 74.

In the second orientation, as shown in FIG. 1B, the exit adapter 50 and exit bracket 70 may be selectively installed on an unmodified cable tray 10C (e.g., a first cable tray) to support a cable tray 20C (e.g., a second cable tray). In some such embodiments, cables (not shown) may extend over a side wall 16C of the cable tray 10C, along the ramp 54 of the exit adapter 50, then through the exit bracket 70 and onto the cable tray 20C through an end 28C of the cable tray 20C. As similarly discussed above and further detailed below, the cable tray 20C can be hung from a channel on the exit bracket 70. Further, in some examples, the exit bracket 70 may be secured to cable tray 20C (e.g., the floor 24C) via the fasteners 72 or further secured to the ends 28C of a side wall 26C of the cable tray 20C via fasteners 74. In some embodiments, the cable tray 20C may be oriented with a floor 24C of the cable tray 20C substantially perpendicular to a floor 14C of the cable tray 10C.

FIGS. 2A through 5 illustrate an exit bracket 100 according to an embodiment of the disclosure. The exit bracket 100 is similar, and in some instances, substantially identical, to the exit bracket 70. Accordingly, discussion of the exit bracket 70 above applies to the bracket 100, and vice versa, unless otherwise noted or required.

The exit bracket 100 is configured to have an overall shape similar to that of a cross-section of a cable tray (i.e., U-shaped as described above), although other shapes are possible. Further, U-shaped or other profiles can alternatively be provided by different wall structures of a bracket than are shown for the bracket 100. In particular, in the illustrated example, the exit bracket 100 has a first section 102 extending between a second section 104 and a third section 106. The first section 102 is configured to have a length approximately the same as the length of a floor of a cable tray. In some embodiments, the length of the first section 102 may be longer than the length of the floor of the cable tray. Generally, the exit bracket 100 can thus define a cable passage from a top end to a bottom end of the bracket 100 (i.e., vertically relative to FIGS. 2A and 2B), through which cables or other components can be routed, from an overhead component of a cable tray system (e.g., an overhead tray, indirectly via an exit adapter), to a tray section that is suspended from the bracket 100.

The first, second, and third sections 102, 104, 106 include a first, second, and third wall 108, 110, 112, respectively, each with a bottom edge 114, 116, 118 and a top edge 120, 122, 124. Extending from each of the bottom edges 114, 116, 118 is a lip 126, 128, 130 that first curves away from, then alongside and spaced from, the respective first, second, and third wall 108, 110, 112. In particular, the lips 126, 128, 130 extends away from the cable passage through the U-shaped profile of the bracket 100, so that a cable tray can be supported by the lips 126, 128, 130 without interfering with cables passing across the bracket 100.

Also in the example shown, the lips 126, 128, 130 extend along each respective first, second, and third wall 108, 110, 112 to define a channel 132 (e.g., bracket channel). The channel 132 is sized and configured to receive and hold a latitudinal wire at an end of a cable tray section that extends along a floor of the cable tray section and up both side walls. In particular, in some embodiments, a portion of the channel 132 corresponding to the first wall 108 and the lip 126 is configured to receive and hold the latitudinal wire at an end of a cable tray section that extends along a floor of the cable tray section. Further, the channel 132 can generally open upwardly relative to an installed configuration of the bracket 100, so as to easily receive and securely retain and suspend wires of a supported cable tray.

Continuing, in some embodiments, a portion of the channel 132 corresponding to the second wall 110 and the third wall 112 is configured to receive and hold a transvers wire that extends along opposed side walls at an end of a cable tray section (e.g., and also continuously across the floor of the cable tray section). Further, voids 134 can be spaced along the lips 126, 128, 130 to accept cable tray wires running longitudinally along the cable tray section, perpendicular to the latitudinal wire received within the channel 132.

In some case, the voids 134 or other structures can define a plurality of tabs 136 (e.g., bracket tabs) along the lips 126, 128, 130. Some of the tabs 136 can include apertures 138 therein. Here, the exit bracket 100 includes two apertures 138 spaced apart in the lip 126 of the first section 102, one aperture 138 in the lip 128 of the second section 104, and one aperture 138 in the lip 130 of the third section 106.

Further, the first, second, and third walls 108, 110, 112 include apertures 140 (e.g., wall apertures) therein that are in alignment with the respective apertures 138 in the lips 126, 128, 130. Accordingly, fasteners can be received through sets of the apertures 138, 140 (e.g., bolts as shown for fasteners 72, 74 in FIGS. 1A-1B). This arrangement of the apertures 138, 140 positions the fasteners to extend over the latitudinal wire of the cable tray section when installed within the channel 132 to retain the cable tray section therein. In other embodiments, including for an exit bracket 200 shown in FIG. 12, more apertures (e.g., apertures 238, 240) can be provided, including to accommodate wider cable tray sections. In other embodiments, fewer (e.g., no) apertures can be provided.

Also shown for the example bracket 100, the top edges 120, 122, 124 of the first, second, and third sections 102, 104, 106 are furled to extend over the channel 132. As noted above, the furled top edges 120, 122, 124 are configured to be extend away from the attached vertically oriented cable tray section. Such an arrangement can create a flared entrance to the exit bracket 100 to help with alignment with an exit adapter during installation and reduce the chance of an edge contacting and damaging cables running along the relevant tray section.

Further, extending upward from the top edge 120 of the first section 102 is a mating flange 142. In the illustrated example, the mating flange 142 extends from the furled geometry of the top edge 120, which may provide favorable attachment and loading arrangements for installed assembly. Similarly, the mating flange 142 includes a hook 144 that extends back toward the cable passage of the bracket 100 (e.g., in the direction opposite of the furled top edge 120 and away from the channel 132. In some cases, the mating flange 142 includes a set of apertures, including a first aperture 146 (e.g., bracket mating aperture, flange aperture) and a second aperture 148 (e.g., bracket mating aperture, flange aperture), on either side of the hook 144.

Figure 6:
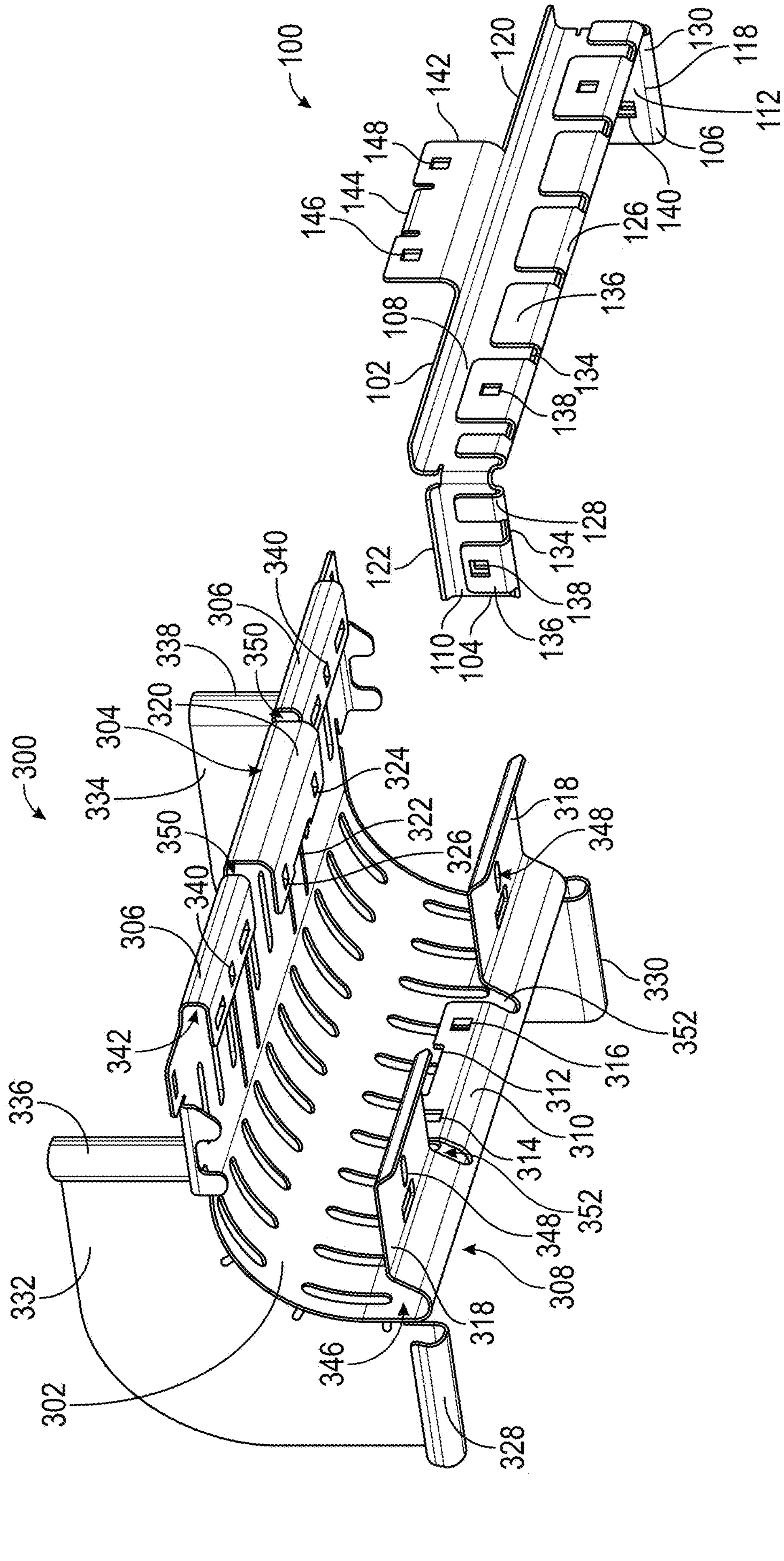
FIG. 6 is a front bottom left isometric exploded view of the exit bracket of FIG. 2A and an exit adapter in a first orientation.
Figure 7A:
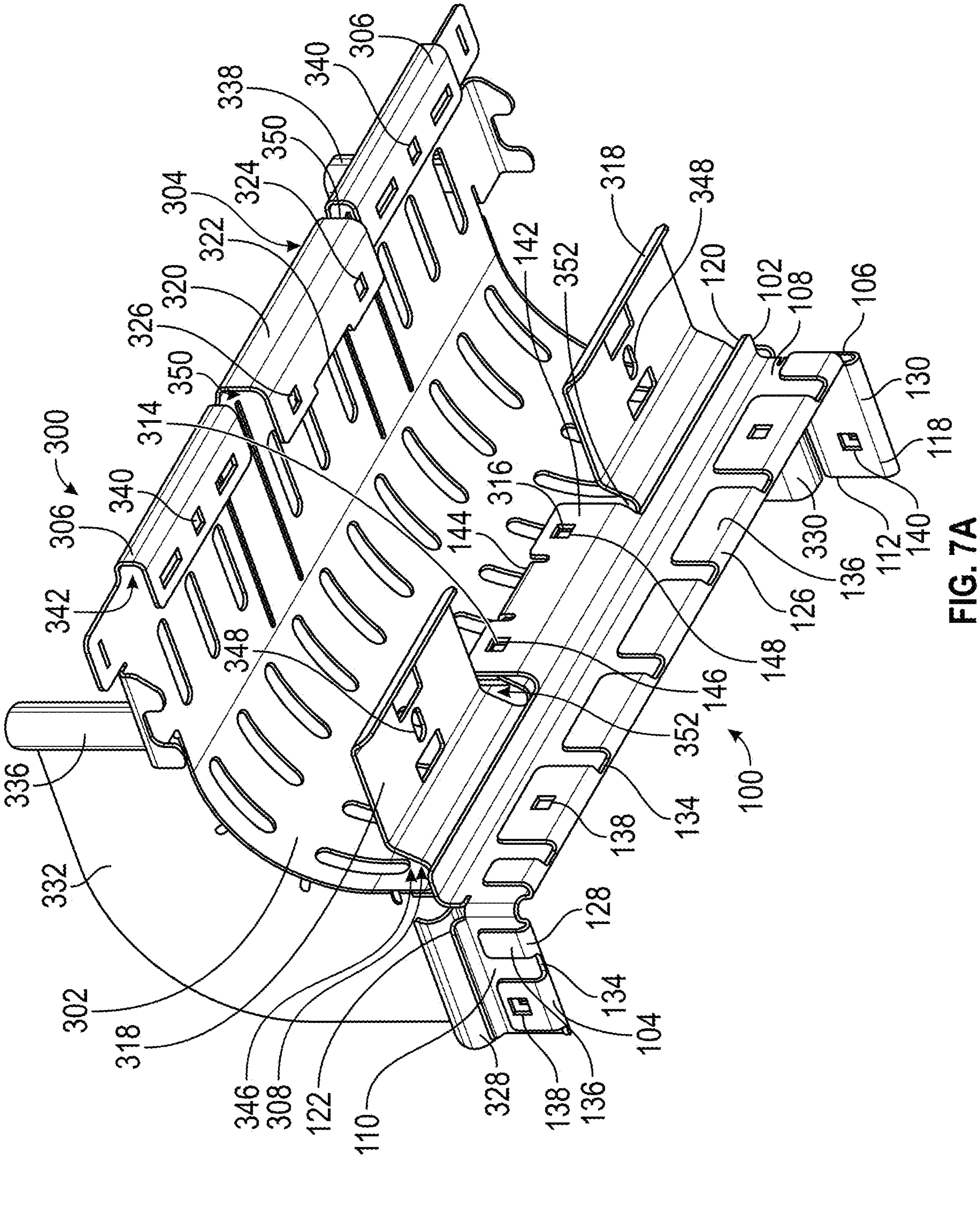
FIG. 7A is a front bottom left isometric view of the exit bracket of FIG. 2A combined with the exit adapter in the first orientation.
Figure 7B:
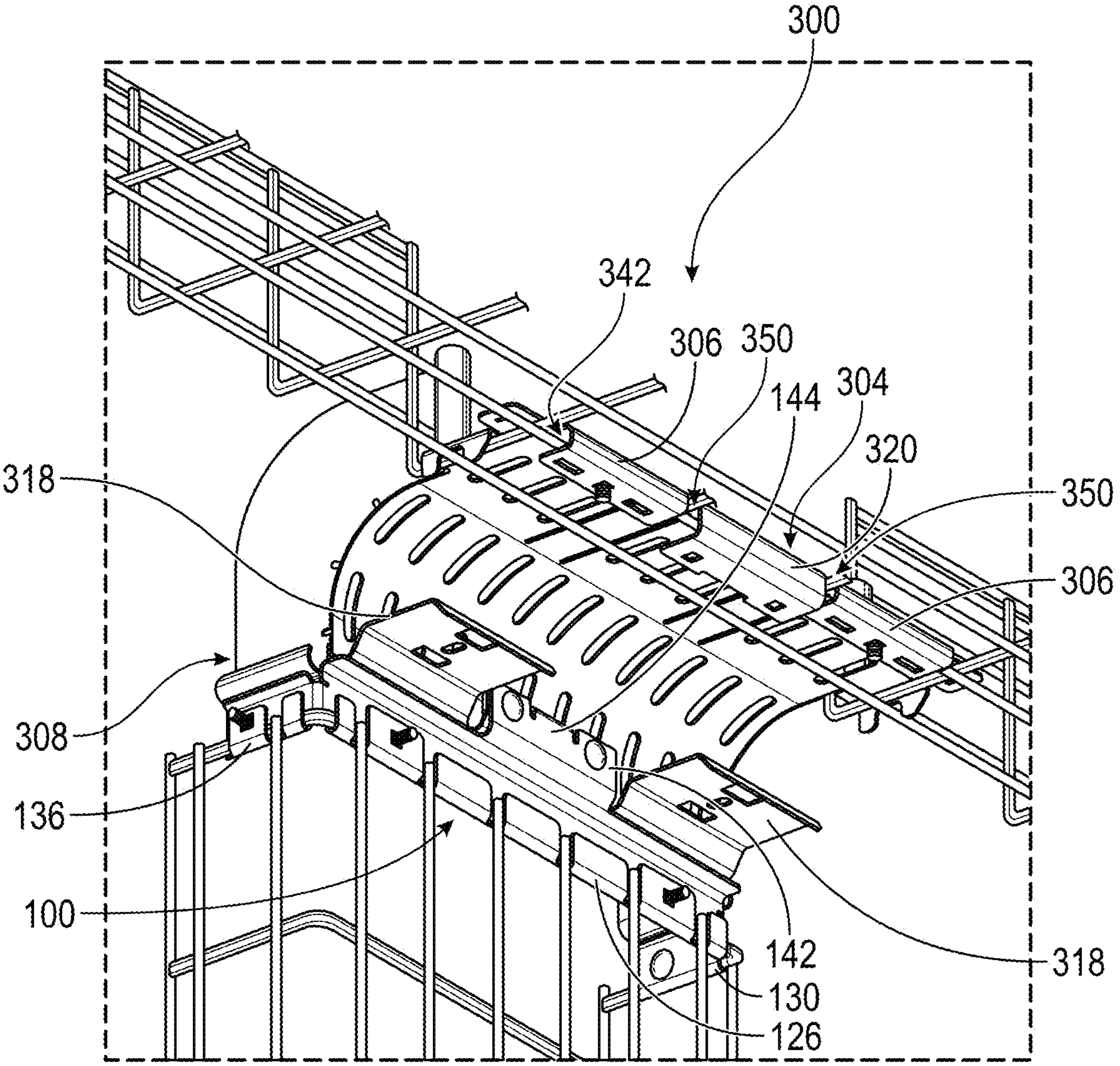
FIG. 7B is a front bottom left isometric view of the exit bracket and exit adapter in the first orientation of FIG. 7A installed on cable trays.
Figure 8:
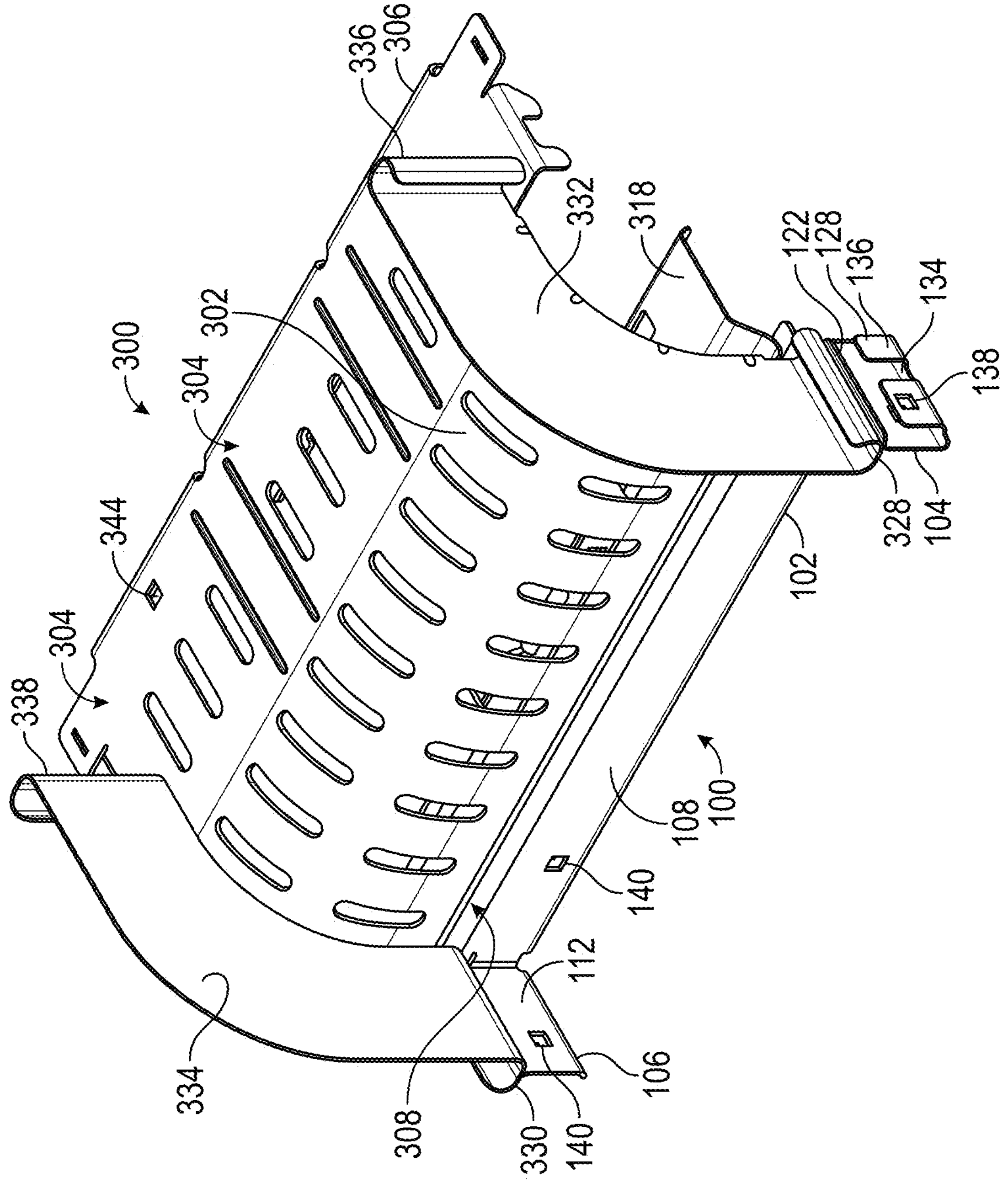
FIG. 8 is a rear top left isometric view of the combined exit bracket and exit adapter of FIG. 7.

Looking at FIGS. 6 through 8, an exit adapter 300 according to one example, is shown in a first orientation. The exit adapter 300 is similar, and in some instances, substantially identical, to the exit adapter 50 shown in FIGS. 1A-1B. Accordingly, discussion of the exit adapter 50 above applies to the exit adapter 300, and vice versa, unless otherwise noted or required.

In the first orientation, a ramp 302 of exit adapter 300 can be aligned to guide cables through a cut section of a side wall of a modified cable tray. A first end 304 of the ramp 302 can have one or more first tabs 306 (e.g., one or more first hooks) configured to engage with one more wires of a floor of the cable tray. Specifically, in some embodiments, the one or more first tabs 306 each include at least one aperture 340 (e.g., adapter tab apertures). Further, in some embodiments, the exit adapter 300 includes at least one aperture 344 (e.g., a ramp aperture) at the first end 304 of the ramp 302, which align with the at least one aperture 340.

The one or more first tabs 306 and mating tab 320 (e.g., a first mating tab, a first mating hook) define a first channel 342 (e.g., first adapter channel). In the embodiment shown in at least FIGS. 6-8, the first channel 342 is a discontinuous channel via first channel voids 350. When the exit adapter 300 is selectively secured to the modified cable tray, a longitudinal wire (see, e.g., longitudinal wire 12A of FIG. 1A) extends through the first channel 342. Further, the first channel 342 can be a discontinuous channel to accommodate for transverse wires of the cable tray (see, e.g., transverse wires 13A of FIG. 1A) via the first channel voids 350. Said differently, the first channel voids 350 allow the transverse wires of the cable tray to extend into the first channel 342, as shown in FIG. 7B.

Similar to the one or more first tabs 320 and mating tab 320, the one or more second tabs 318 (e.g., one or more second hooks) and mating tab 310 (e.g., a second mating tab, a second mating hook) define a second channel 346 (e.g., second adapter channel). In the embodiment shown in at least FIGS. 9-11, the second channel 346 is a discontinuous channel via second channel voids 352. When the exit adapter 300 is selectively secured to the modified cable tray in the second orientation, a longitudinal wire of a side wall of the cable tray (see, e.g., wire 608 of FIGS. 16A-18) extends through the second channel 346. Further, the second channel 346 can be a discontinuous channel to accommodate for transverse wires of the side wall of the cable tray (see, e.g., wire 606 of FIGS. 16A-18) via the second channel voids 352. Said differently, the second channel voids 352 allow the transverse wires of the cable tray to extend into the second channel 346.

As shown in FIGS. 6-8, the exit bracket 100 is configured to be coupled to a second end 308 of the ramp 302 with the exit adapter 300 in the first orientation. Specifically, in the first orientation (see, e.g., FIG. 1A), the first end 304 may define a cable entrance, where cable from a first cable tray (e.g., cable tray 10A of FIG. 1A) enters the exit adapter 300 and exits at the second end 308 (e.g., a cable exit), through the exit bracket 100, and onto a second cable tray (e.g., cable tray 20A of FIG. 1A). In other embodiments, cable from the second tray may enter the exit adapter 300 at the second end 308 and exit the exit adapter 300 at the first end 304, onto the first cable tray. In some embodiments, fasteners (see, e.g., fasteners 56 of FIG. 1A) can be inserted through the at least one aperture 340 and the at least one aperture 344 (e.g., ramp aperture) to further secure the exit adapter 300 to the modified cable tray (see, e.g., cable tray 10A of FIG. 1A).

Generally, an exit adapter can include integral support structures to easily align and secure an exit bracket. For example, as illustrated in FIGS. 6-8, the second end 308 has a mating tab 310 that can be aligned to be secured to the mating flange 142 of the bracket 100. In particular, the mating tab 310 can have a notch 312 (e.g., an open notch as shown, a differently configured indent, or a close-sided channel). The notch 312 can be configured to receive the hook 144 of the mating flange 142 of the exit bracket 100 to help secure and suspend the exit bracket 100 relative to the exit adapter 300. Further, first and second apertures 146, 148 of the mating flange 142 can be aligned with the first and second apertures 314, 316 of the mating tab 310 to receive fasteners for further securement. According to the illustrated embodiment, the interface between the hook 144 and the notch 312—and generally between the mating tab and flange 310, 142—centers the bracket 100 relative to the exit adapter 300 (e.g., to align the respective first apertures 146, 314 and the second apertures 148, 316 thereof).

Figure 9:
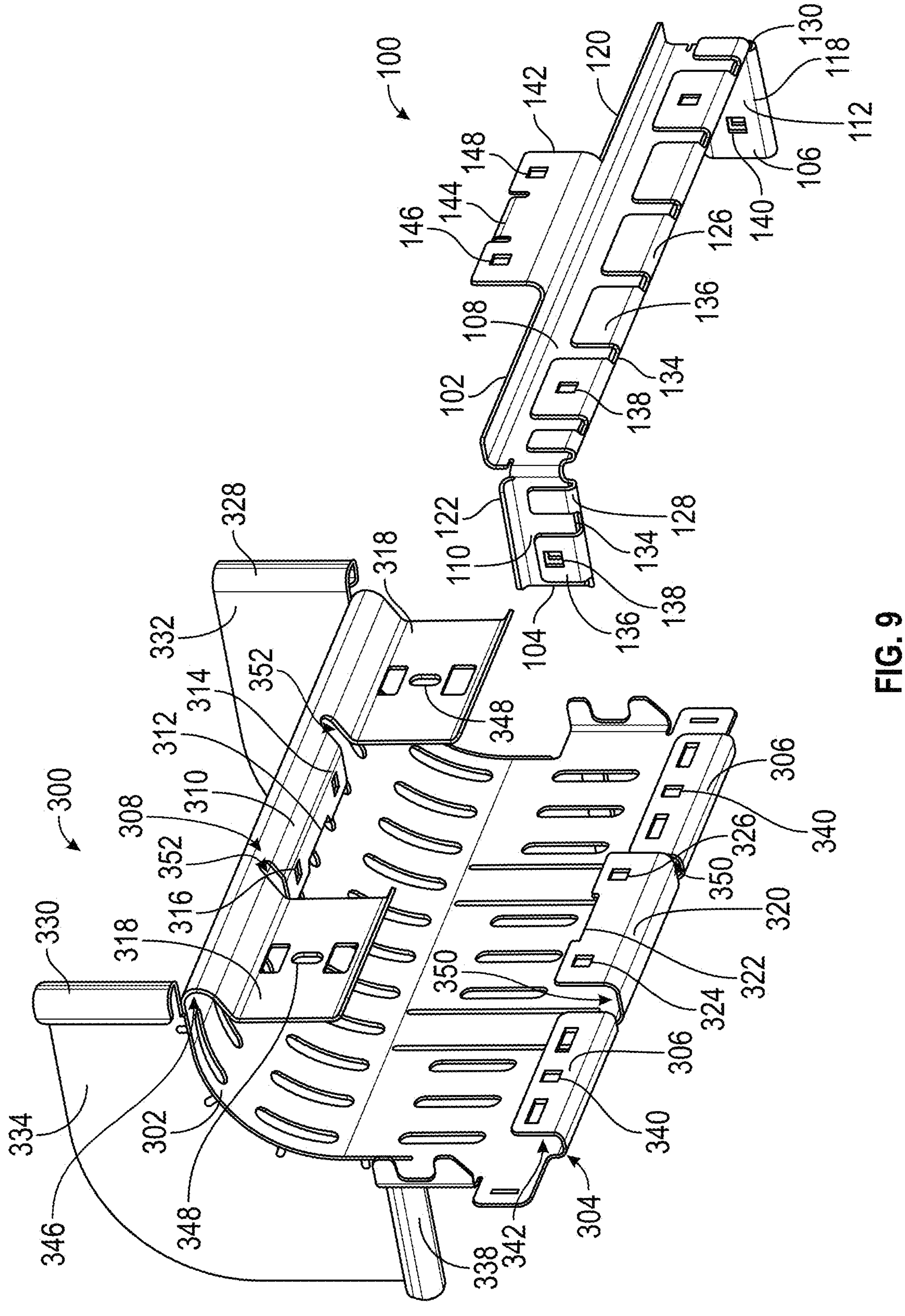
FIG. 9 is a front bottom left isometric exploded view of the exit bracket of FIG. 2A and the exit adapter in a second orientation.
Figure 10A:
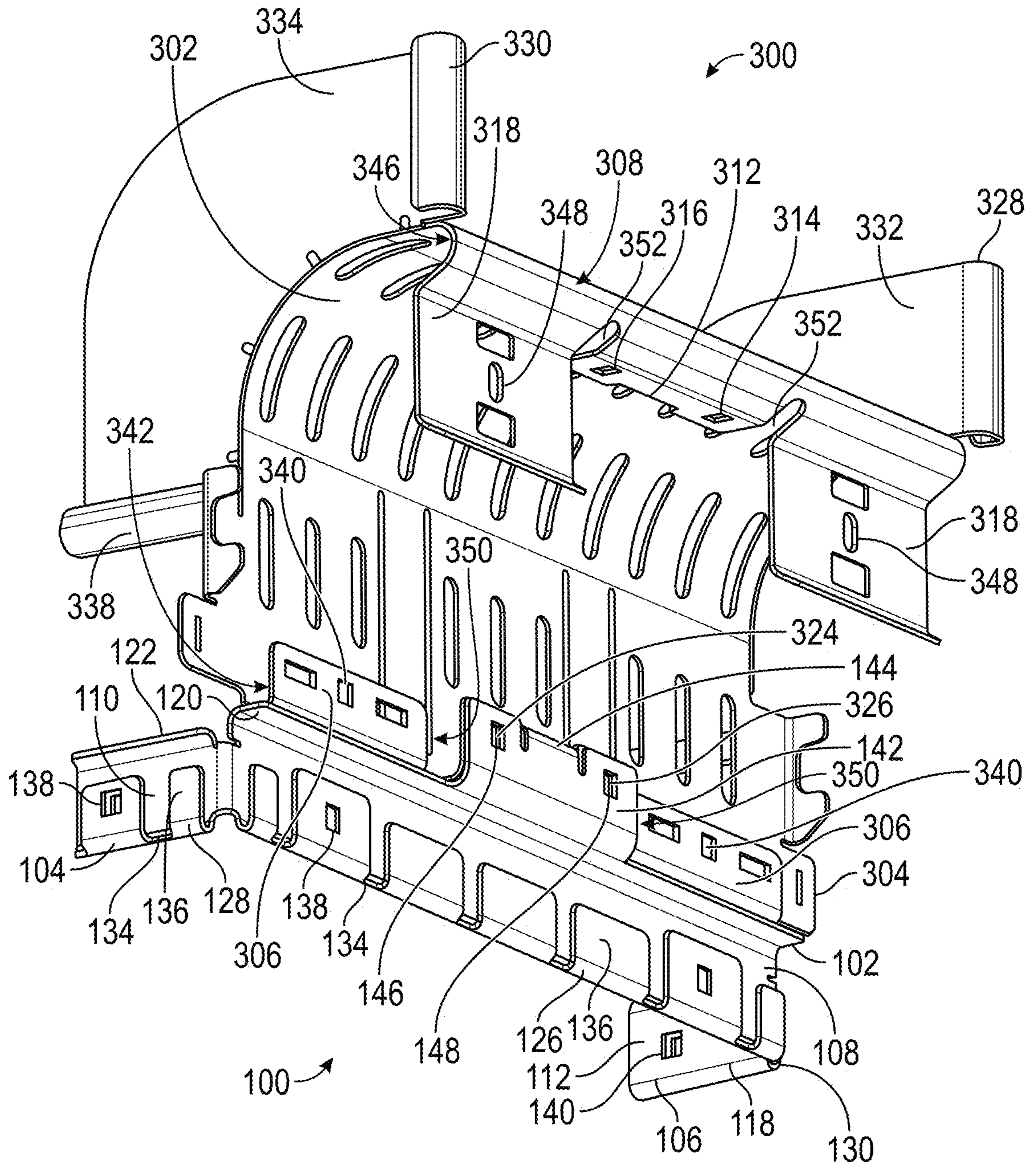
FIG. 10A is a front bottom left isometric view of the exit bracket of FIG. 2A combined with the exit adapter in the second orientation.
Figure 10B:
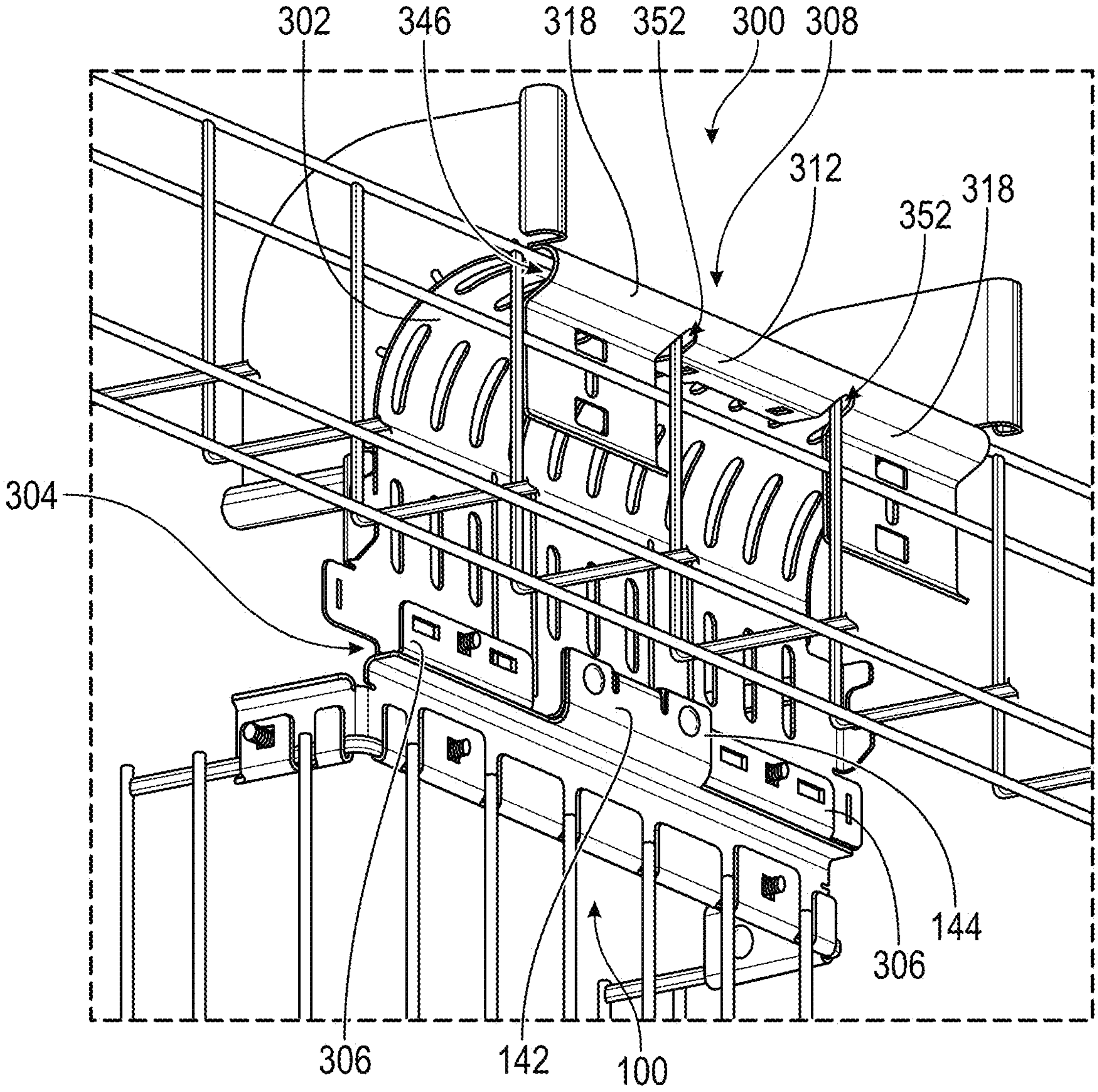
FIG. 10B is a front bottom left isometric view of the exit bracket and exit adapter in the second orientation of FIG. 10A installed on cable trays.
Figure 11:
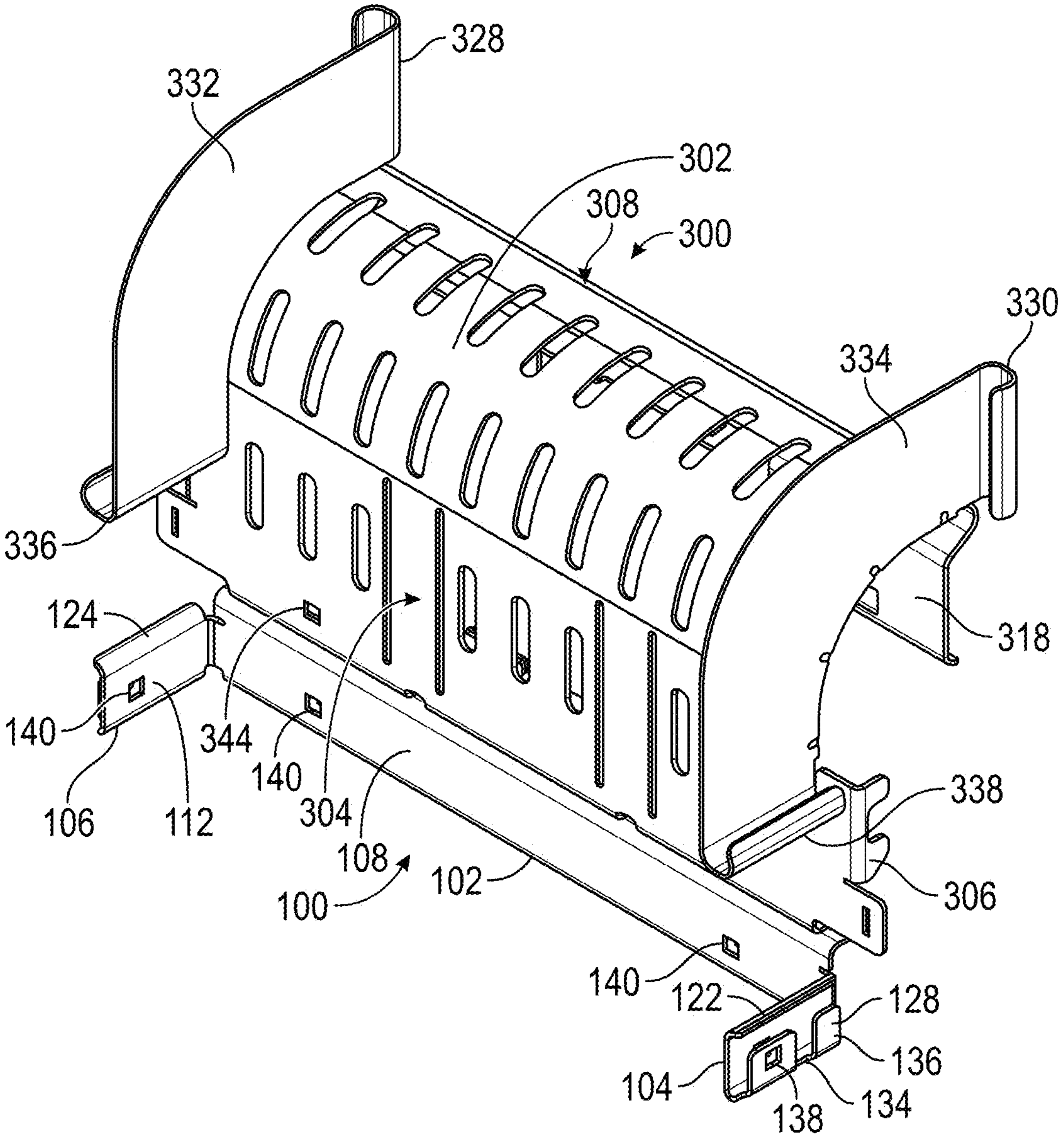
FIG. 11 is a rear top left isometric view of the combined exit bracket and exit adapter of FIG. 10.

FIGS. 9 through 11 show the exit adapter 300 in the second orientation in which the ramp 302 can be placed over a side wall of a cable tray (see, e.g., FIG. 1B). Specifically, in the second orientation (see, e.g., FIGS. 1B), the second end 308 may define a cable entrance, to receive cable from a first cable tray (e.g., cable tray 10C of FIG. 1B). The cable can then exit the exit adapter 300 at the first end 304, to pass through the exit bracket 100 and onto a second cable tray (e.g., cable tray OC of FIG. 1B). In other embodiments, cable from the second tray may enter the exit adapter 300 at the first end 304 and exit the exit adapter 300 at the second end 308, onto the first cable tray.

As generally shown in FIG. 1B, the second channel 346 receives a longitudinal wire of the side wall of the cable tray in the second orientation. The second end 308 of the ramp 302 can have one or more second tabs 318 configured to engage with one or more wires of the side wall of the cable tray. In some embodiments, the one or more second tabs 318 each include at least one aperture 348 (e.g., adapter tab aperture). In the second orientation of the exit adapter 300, the apertures 348 may include fasteners that further secure the exit adapter 300 to the side wall of the cable tray.

In the second orientation, the exit bracket 100 is configured to be coupled to the first end 304 of the ramp 302. For example, as illustrated, the first end has the mating tab 320, which can have a notch 322 and a set of apertures, including a first aperture 324 (e.g., mating hook aperture, hook aperture, mating tab aperture) and a second aperture 326 (e.g., mating hook aperture, hook aperture, mating tab aperture). The notch 322 can be configured to receive the hook 144 of the mating flange 142 of the exit bracket 100, and the first and second apertures 146, 148 of the mating flange 142 are configured to be aligned with the first and second apertures 324, 326 (e.g., adapter mating apertures) of the mating tab 320 to receive a fastener (e.g., a bolt) there through to secure the exit bracket to the exit adapter 300. Or, in other configurations, other attachment structures can be used (e.g., with similar interfaces as at the second end 308, to accommodate selective installation in different orientations with the same exit bracket).

As shown, with the exit adapter 300 in the first orientation (FIGS. 6 through 8), the furled first edge 120 of the exit bracket 100 can be configured to sit below (e.g., against) the second tabs 318 on the second end 308 of the ramp 302, and the furled second and third edges 122, 124 can be configured to sit below (e.g., against) furled edges 328, 330 of respective first and second side walls 332, 334 of the exit adapter 300. The first side wall 332 is located at a first side of the ramp 302, and extends between the first end 304 and the second end 308. The second side wall 334 is located at a second side of the ramp 302, opposite from the first side (e.g., opposite the first side wall 332), and extends between the first end 304 and the second end 308. The close fit at the intersection between the exit bracket 100 and the exit adapter 300 leaves very little room for cables laid within the cable tray to be caught during or after installation.

Similarly, with the exit adapter 300 in the second orientation (FIGS. 9 through 11), the furled first edge 120 of the exit bracket 100 can be configured to sit below (e.g., against) the first tabs 306 on the first end 304 of the ramp 302, and the furled second and third edges 122, 124 can be configured to sit below (e.g., against) furled edges 338, 336 of the respective second and first side walls 334, 332 of the exit adapter 300, reducing the potential for a cable to contact an edge that could cause damage to the cable.

Thus, when the exit adapter 300 is selectively secured to a cable tray in the first orientation (see, e.g., FIG. 1A), the exit bracket 100 can correspondingly be selectively secured to the exit adapter 300 at the second end 308 of the ramp 302. Similarly, when the exit adapter is selectively secured to the cable tray in the second orientation (see, e.g., FIG. 1B), the exit bracket 100 can correspondingly be selectively secured to the exit adapters 300 at the first end 304 of the ramp 302.

As mentioned above, FIG. 12 illustrates the example exit bracket 200, as can also be configured to be mounted to an exit adapter (e.g., an exit adapter 400) and support a suspended cable tray similarly to the exit bracket 100. In many aspects, the exit bracket 200 is similar to the exit bracket 100 described above and similar numbering in the 200 series is used for the exit bracket 200. For example, the exit bracket 200 has a first section 202, a second section 204, a third section 206, and a channel 232. The first section 202 includes a first wall 208 with apertures 240, a bottom edge 214, a top edge 220, and a lip 226. The top edge 220 has a mating flange 242 with a hook 244, a first aperture 246, and a second aperture 248. Further, voids 234 in the lip 226 define tabs 236 with apertures 238. Unless otherwise indicated, discussion of components above should be understood to apply to similarly numbered components below, and vice versa.

Figure 12:
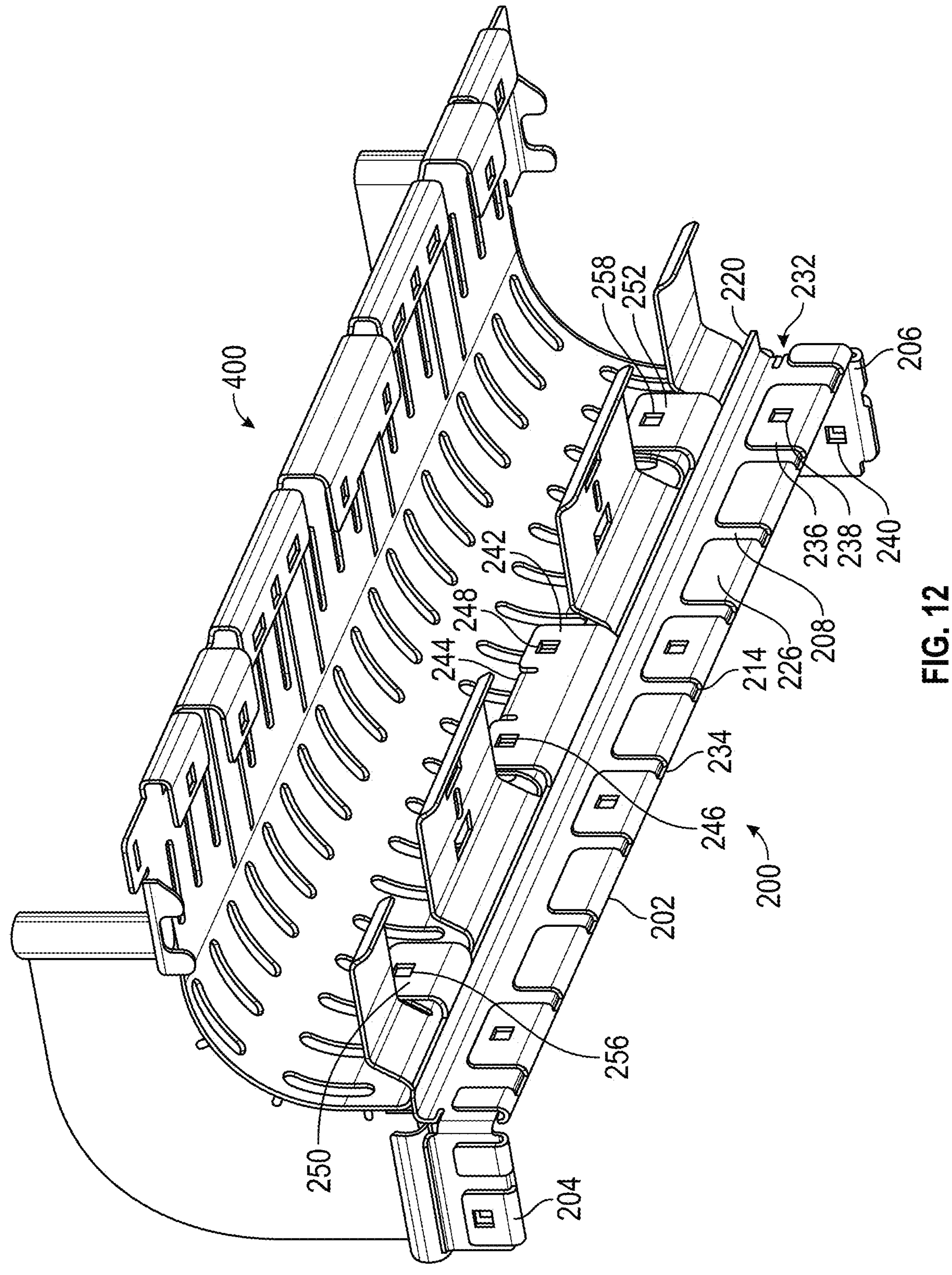
FIG. 12 is a front bottom left isometric view of an exit bracket according to another embodiment of the disclosure combined with an exit adapter.

In some aspects, however, the exit adapters 300, 400 differ from each other. For example, as shown in FIG. 12, the exit adapter 400 is wider than the exit adapter 300 on which the exit bracket 100 is selectively mountable (i.e., as measured transverse to a direction of a cable path across the exit bracket 100).

Further, in some aspects, the exit bracket 200 differs from the exit bracket 100. For example, as shown in FIG. 12, the exit bracket 200 is wider than the exit bracket 100 (i.e., as measured transverse to a direction of a cable path across the exit bracket 100). To provide additional support and security, the top edge 220 includes first and second lateral mating flanges 250, 252 (e.g., each with a respective aperture 256, 258). The first and second apertures 246, 248 in the mating flange 242 and the apertures 256, 258 in the first and second lateral mating flanges 250, 252 are configured to be selectively aligned with corresponding apertures on respective mating tabs on both the first end and the second end of the exit adapter 400, depending on the installation orientation of the exit adapter 400. Additionally, four of the tabs 236 in the first section 202 have apertures 238 configured to align with four apertures 240 in the first wall 208. As stated above, more or fewer apertures 238, 240 can be provided if desired depending on any number of factors (e.g., weight or width of the tray section).

Figure 16A:
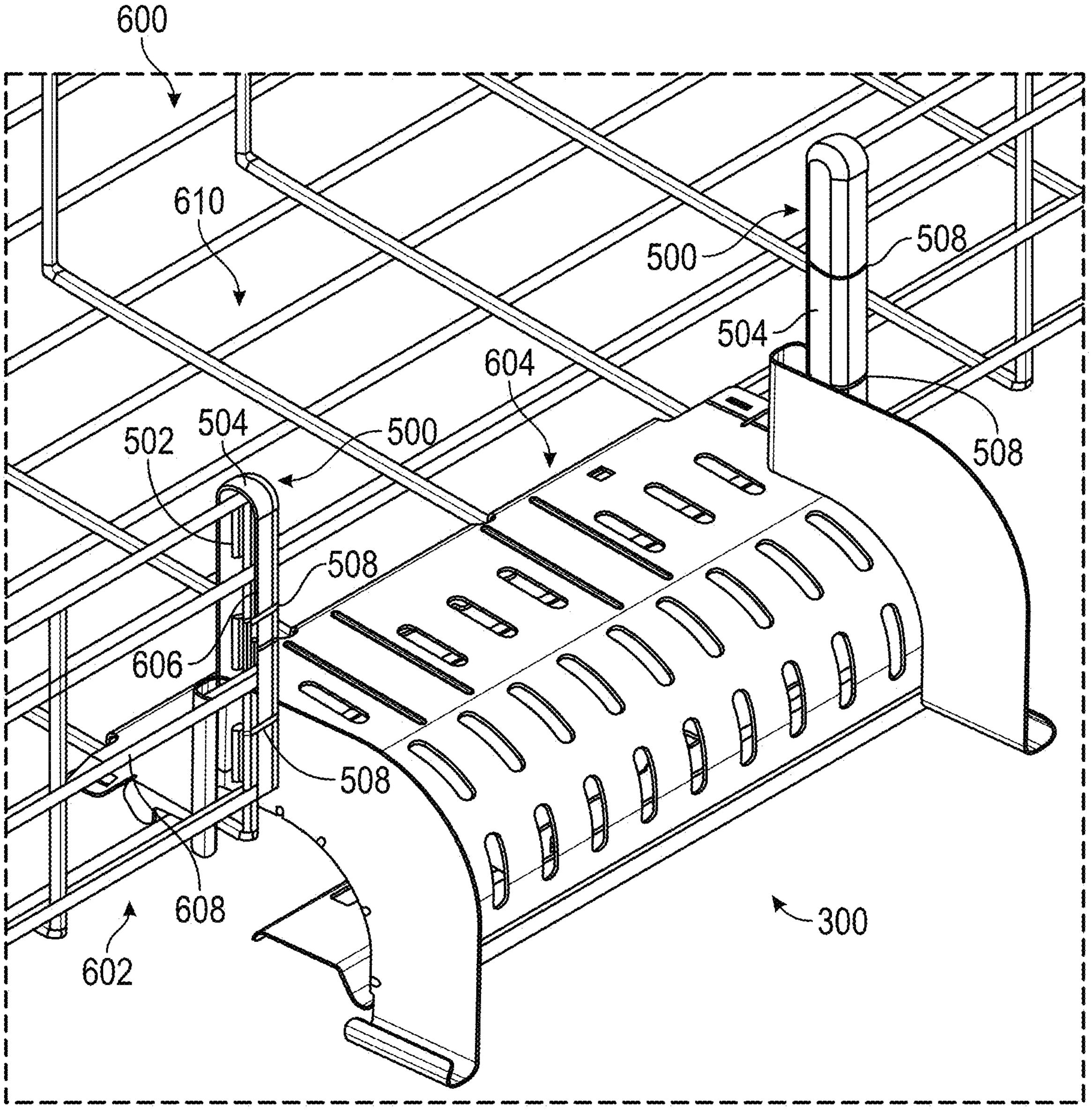
FIG. 16A is an isometric view of a set of the guards of FIG. 13 installed on a side wall of a cable tray according to an embodiment of the disclosure.
Figure 16B:
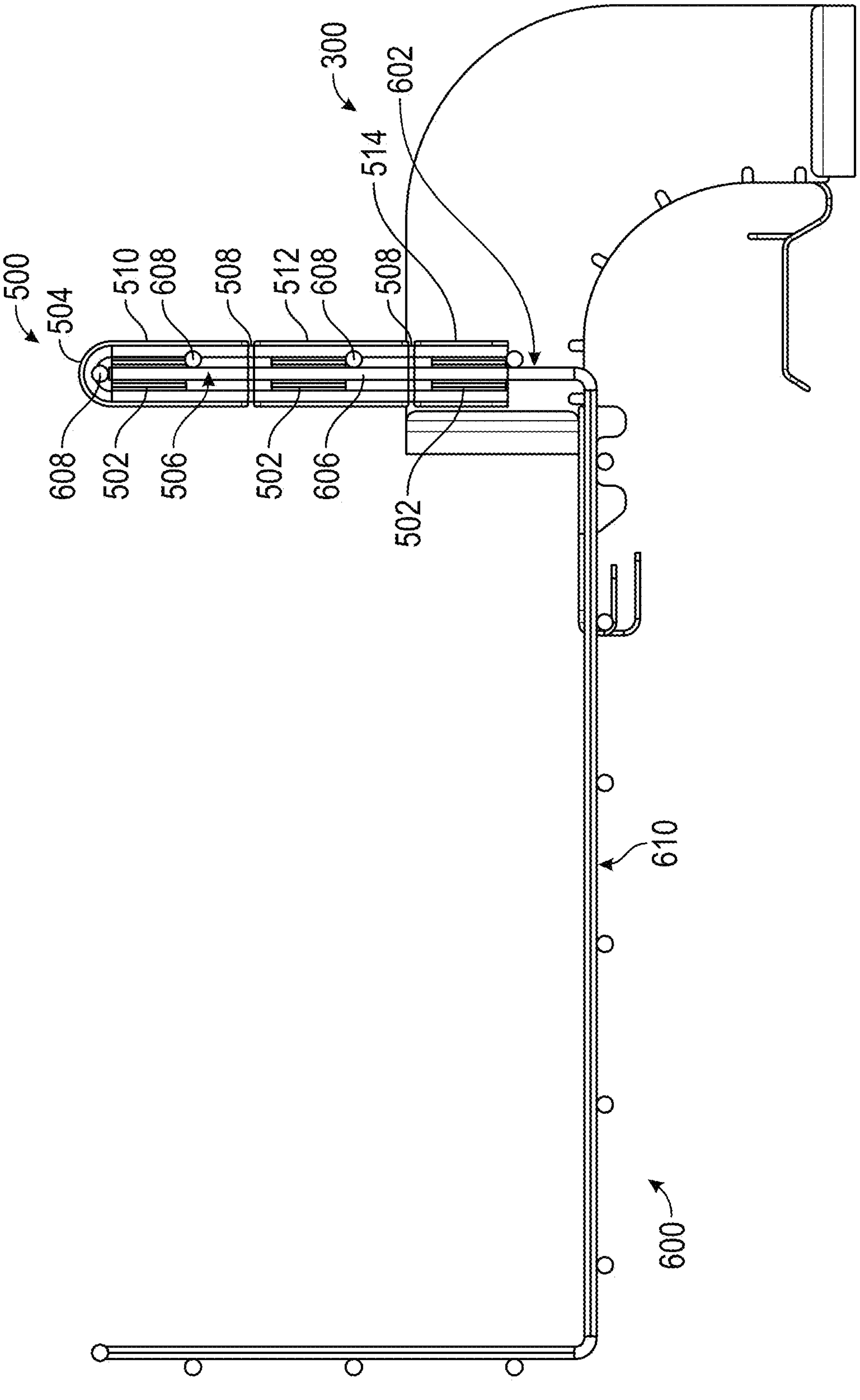
FIG. 16B is a side elevation view of one the guards of FIG. 16A.

FIGS. 13A, 13B, 16A, and 16B illustrate a guard 500 that can be installed to cover cut ends of a side wall of a cable tray (e.g., a side wall 602 of a cable tray 600 shown in FIG. 16B) when an exit adapter (e.g., the exit adapter 300 as shown in FIG. 16B) is selectively installed at a side wall exit (e.g., a side wall exit 604 shown in FIG. 16B). As discussed above, the guard 500 can prevent damage to cables or wires laid within the cable tray 600 (e.g., a first cable tray) and through the side wall exit 604.

The guard 500 includes a set of snaps 502 that are designed to receive and retain a vertical wire 606 (shown in FIGS. 16A and 16B) of the side wall 602 of the cable tray 600 at the location of the side wall exit 604. The snaps 502 should be configured to be pliable enough to allow the snaps 502 to spread apart to receive a wire without breaking, yet rigid enough to retain the wire therein. In some embodiments, the guard 500 and snaps 502 can be integrally formed from plastic. The snaps 502 can be spaced (i.e., not continuous) to not interfere with longitudinal wires 608 (shown in FIG. 16A) of the side wall 602 along a vertical direction, defined as extending upward from and perpendicular to a length of a floor 610 of the cable tray 600. As shown, the snaps 502 are designed to extend along a portion of the vertical wire 606 between adjacent longitudinal wires 608.

Continuing, the guard 500 has an outer wall 504, which defines a cavity 506 in which the snaps 502 are positioned and which covers the cut ends of the side wall 602 at the side wall exit 604. As shown, the snaps 502 are centrally placed, side-to-side, within the cavity 506 with space laterally between the snaps 502 and the outer wall 504 on either side of the snaps 502. The space on both sides of the snaps 502 provides enough room within the guard 500 to not interfere with and also capture the longitudinal wires 608, regardless of which side of the side wall exit 604 the guard 500 is placed.

Figure 13B:
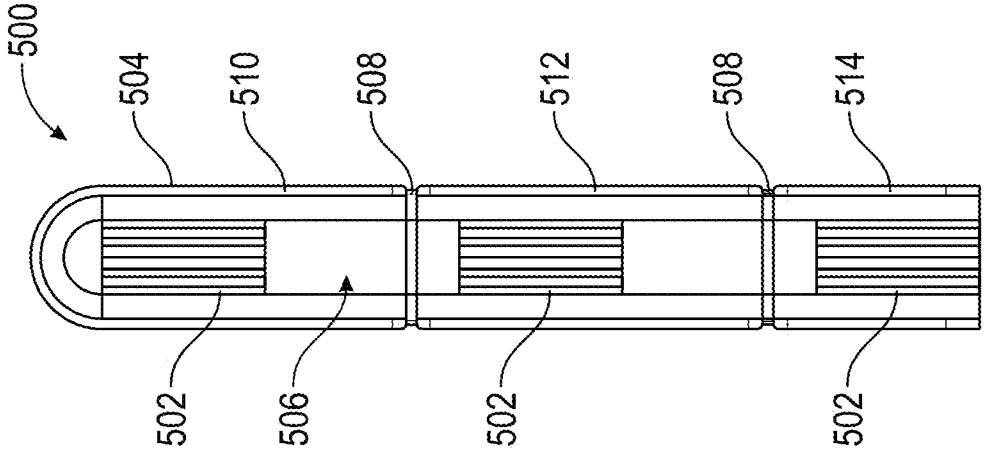
FIG. 13B is front elevation view of the guard of FIG. 13A.
Figure 13A:
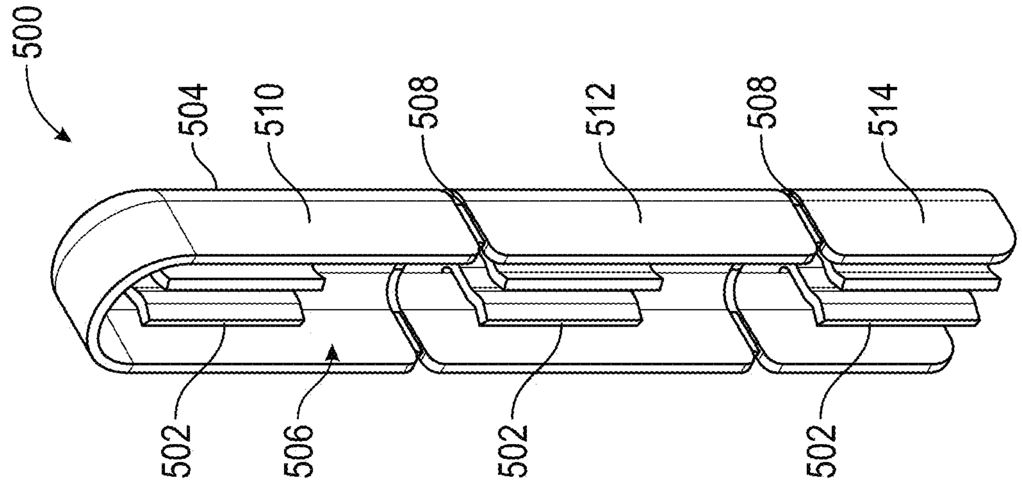
FIG. 13A is a front top right isometric view of a guard according to an embodiment of the disclosure.

The outer wall 504 can also include reliefs 508 at locations between the snaps 502. For example, as shown in FIGS. 13A and 13B, reliefs 508 extend around the outer wall 504 in a direction perpendicular to the vertical direction. The reliefs 508 define sections within the guard 500. For example, the guard 500 has a first section 510, a second section 512, and a third section 514, each section having a snap 502 therein. The reliefs 508 are configured to reduce the thickness of the outer wall 504 at predetermined places there along to make it easier to separate one or more sections 510, 512, 514 of the guard 500 depending on the height of the side wall on which the guard 500 is to be installed or other installation considerations and factors. For example, the guard 500, in an unaltered configuration, can be sized to fit on a cable tray with a side wall with a height of six inches, and if being installed on a side wall that measures four inches, the third section 514 can be separated from the second section 512 to shorten the length of the guard 500 and leaving the first and second sections 510, 512 to be installed.

In some embodiments, the guard 500 may be installed on a longitudinal wire of the floor 610, where the longitudinal wire is proximate the side wall 602. In such embodiments, when the exit adapter 300 is installed in the first orientation (see, e.g., FIG. 1A), the first channel 342 may be sized such that the guard 500 can be inserted in the first channel 342 in addition to the longitudinal wire of the floor 610. In such embodiments, when the exit adapter is installed in the second orientation (see, e.g., FIG. 1B), the second channel 346 may be sized such that the guard 500 can be inserted in the second channel 346 in addition to the longitudinal wire of the floor 610.

Figure 14A:
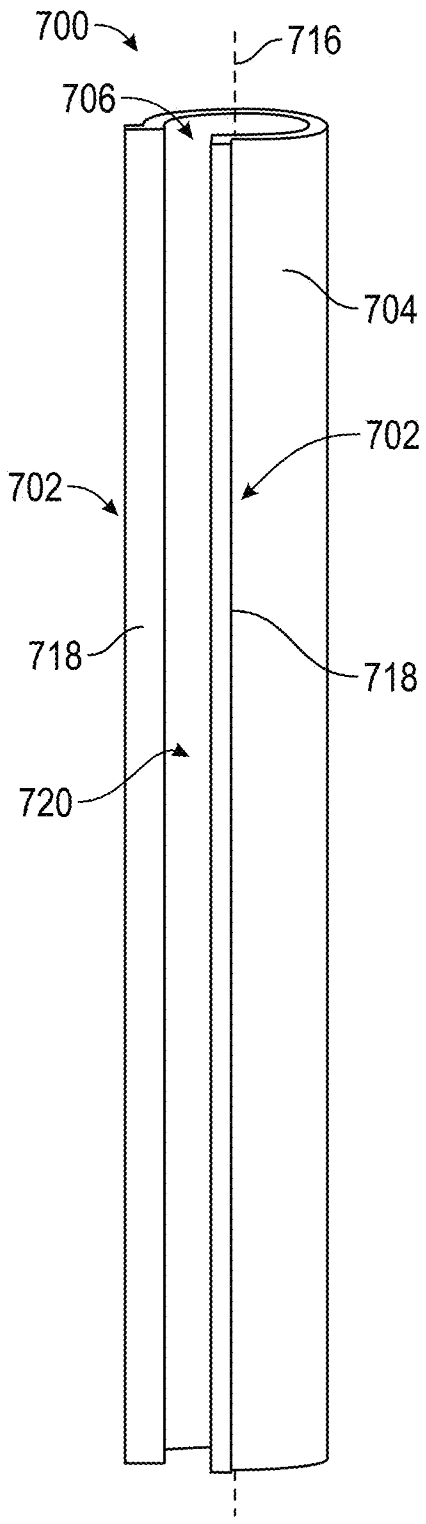
FIG. 14A is a front top right isometric view of another guard according to an embodiment of the disclosure.
Figure 14B:
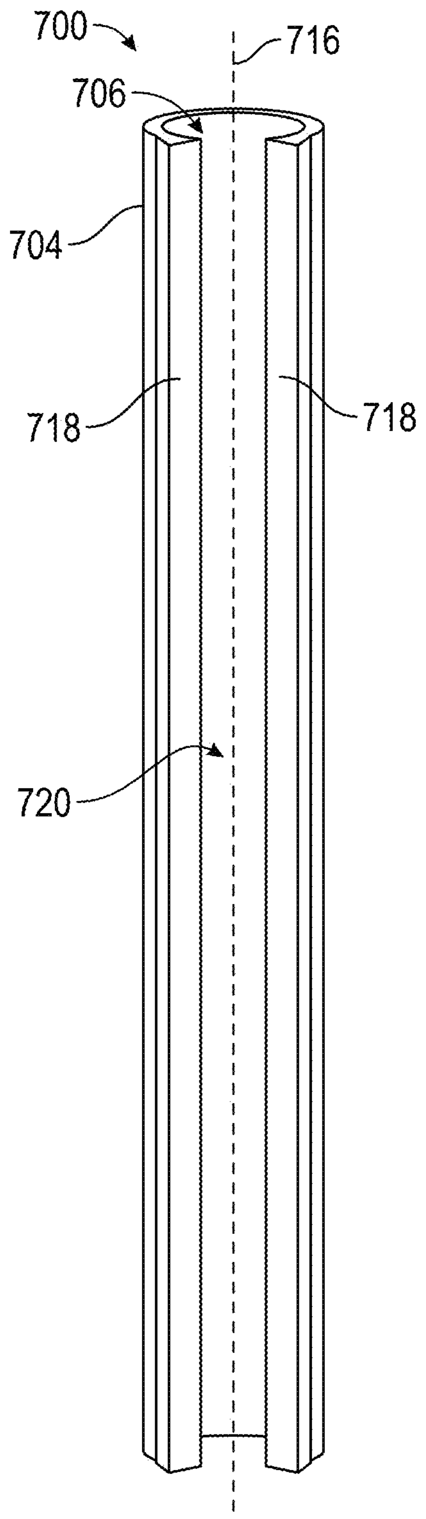
FIG. 14B is front elevation view of the guard of FIG. 14A.
Figure 17:
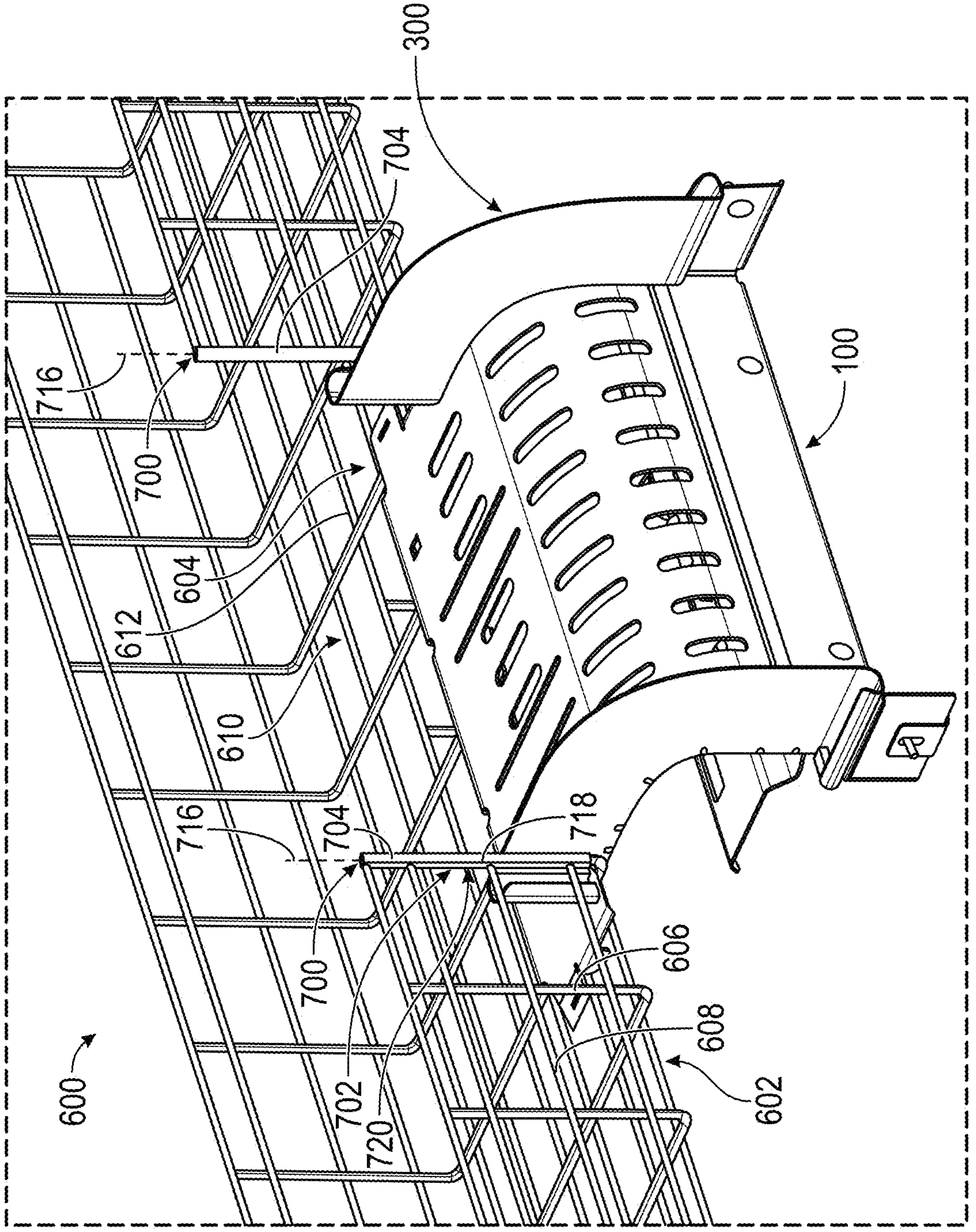
FIG. 17 is an isometric view of a set of the guards of FIGS. 14A and 14B installed on a side wall of a cable tray according to an embodiment of the disclosure.

FIGS. 14A, 14B, and 17 illustrate a guard 700 that can be installed to cover cut ends of a side wall of a cable tray (e.g., the side wall 602 of the cable tray 600, shown in FIG. 17), including when the exit adapter (e.g., the exit adapter 300 as shown in FIG. 17) and exit bracket (e.g., the exit bracket 100 as shown in FIG. 17) is selectively installed at a side wall (e.g., the side wall 604 shown in FIG. 17). The guard 700 is similar to the guard 500, and incorporates similar components labeled in the 700 series. For example, the guard 700 includes snaps 702, an outer wall 704, and a cavity 706. Correspondingly, unless otherwise indicated, discussion of components above should be understood to apply to similarly numbered components below, and vice versa.

In some aspects, however, the guards 500, 700 differ from each other. For example, the snaps 702 include inwardly directed lips 718 (e.g., integrally formed with the guard 700). Outer edges of the lips 718 also extend radially outward from the cavity 706, to define a tapered entrance opening 720. Additionally, in the embodiment shown in FIGS. 14A, 14B, and 17, the snap 702 of the guard 700 are formed as a part of the outer wall 704. The cavity 706 defines a guard axis 716 that extends through the guard 700. The guard axis 716 is centered in the cavity 706.

As shown in FIG. 17, the guard 700 may be secured to a vertical wire at the side wall exit 604 of the side wall 602 (e.g., the vertical wire 606 located at the side wall exit 604). Specifically, the snap 702 allow the vertical wire to be inserted through the opening 720. In some embodiments, the lips 718 guide the vertical wire of the side wall 602 into the opening 720, securing the guard 700 to the side wall 602. Thus, in some embodiments, the guard 700 is secured to the side wall 602 when the vertical wire is inserted through the snap 702 (and lips 718) and into the cavity 706. In some embodiments, the guard 700 can be secured by sliding the guard 700 onto the vertical wire in a direction parallel to the guard axis 716, toward the floor 610 of the cable tray 600. In some embodiments, the guard axis 716 is substantially perpendicular to a plane defined by the floor 610 when the guard 700 is secured to the cable tray 600, as shown in FIG. 17. In other embodiments, the guard axis 716 is substantially parallel to the plane defined by the floor 610 when the guard 700 is secured to the cable tray 600. For example, the guard axis 716 may be substantially parallel to the plane defined by the floor 610 when the guard 700 is secured to the cable tray 600 if the guard 700 is secured to a longitudinal wire 612 of the floor 610.

In some embodiments, the guard 700 may be installed on a longitudinal wire of the floor 610, where the longitudinal wire is proximate the side wall 602. In such embodiments, when the exit adapter 300 is installed in the first orientation (see, e.g., FIG. 1A), the first channel 342 may be sized such that the guard 700 can be inserted in the first channel 342 in addition to the longitudinal wire of the floor 610. In such embodiments, when the exit adapter is installed in the second orientation (see, e.g., FIG. 1B), the second channel 346 may be sized such that the guard 700 can be inserted in the second channel 346 in addition to the longitudinal wire of the floor 610.

In some embodiments, the guard 700 is formed of pliable material such that the guard 700 does not interfere with the longitudinal wire 608 of the side wall 602. Specifically, the guard 700 may be formed of pliable material so the snaps 702 can deform to allow the longitudinal wires 608 of the side wall to be inserted through the opening 720 and into the cavity 706. In such embodiments, the lips 718 also deflect to allow the longitudinal wires 608 of the side wall to be inserted through the opening 720 and into the cavity 706.

Figure 15A:
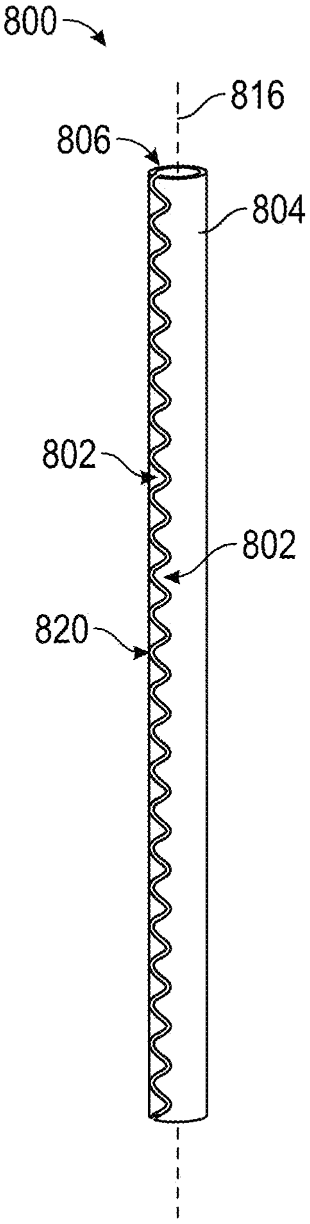
FIG. 15A is a front top right isometric view of yet another guard according to an embodiment of the disclosure.
Figure 15B:
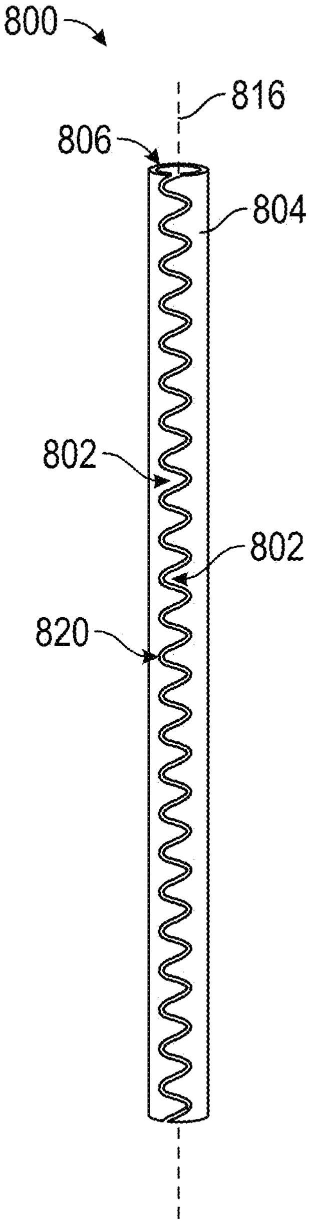
FIG. 15B is front elevation view of the guard of FIG. 15A.
Figure 18:
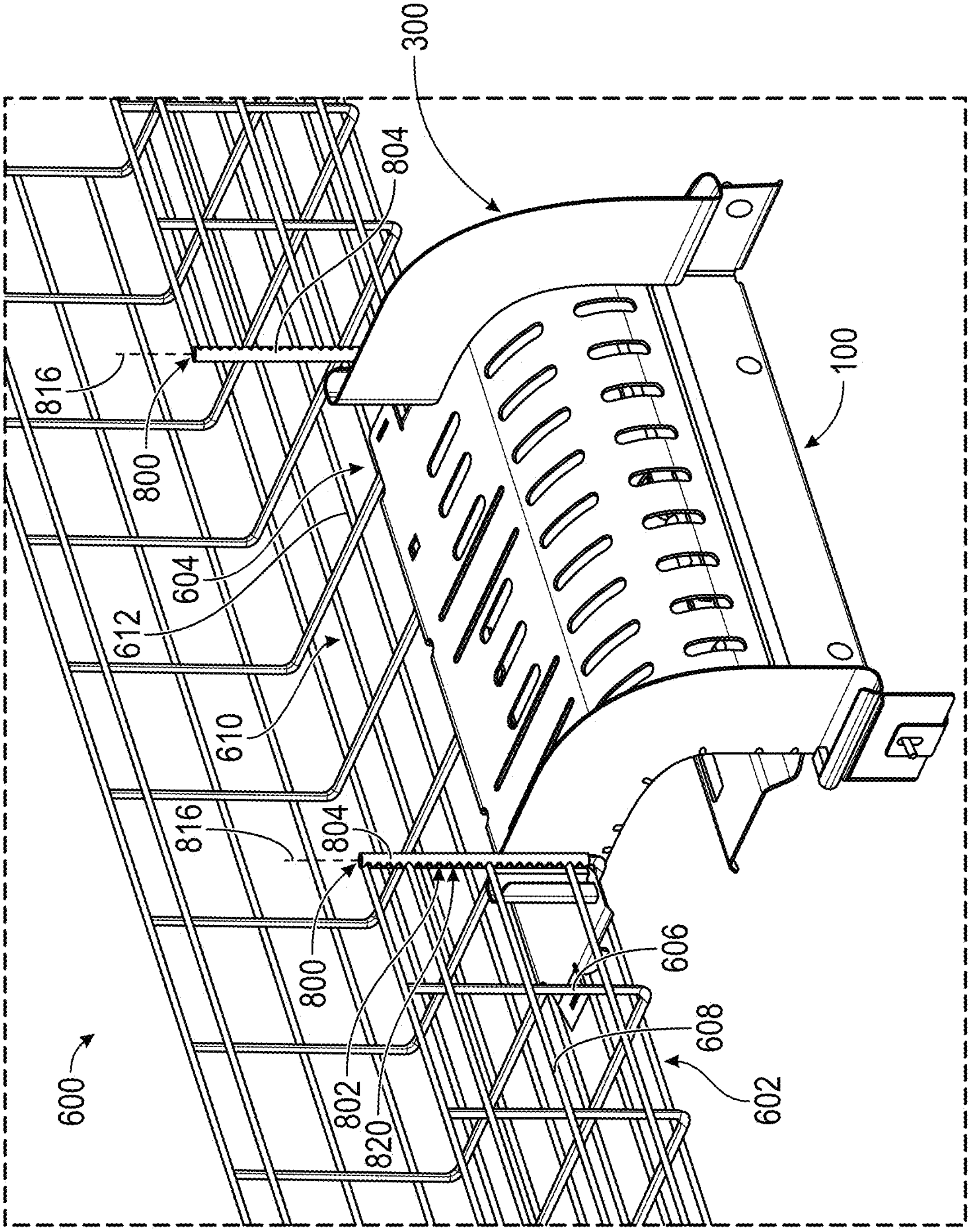
FIG. 18 is an isometric view of a set of the guards of FIGS. 15A and 15B installed on a side wall of a cable tray according to an embodiment of the disclosure.

FIGS. 15A, 15B, and 18 illustrate a guard 800 that can be installed to cover cut ends of a side wall of a cable tray (e.g., the side wall 602 of the cable tray 600, shown in FIG. 18), including when the exit adapter (e.g., the exit adapter 300 as shown in FIG. 18) and exit bracket (e.g., the exit bracket 100 as shown in FIG. 18) is selectively installed at a side wall (e.g., the side wall 604 shown in FIG. 18). The guard 800 is similar to the guard 700, and incorporates similar components labeled in the 800 series. For example, the guard 800 includes a snap 802, an outer wall 804, a cavity 806, an opening 820, and a guard axis 816. Correspondingly, unless otherwise indicated, discussion of components above should be understood to apply to similarly numbered components below, and vice versa.

In some aspects, however, the guards 700, 800 differ from each other. For example, the snaps 802 of the guard 800 may be configured to form an undulating opening 820 (e.g., with smoothly curved edges).

As shown in FIG. 18. similar to the guard 700, the guard 800 may be secured to a vertical wire at the side wall exit 604 of the side wall 602 (e.g., the vertical wire 606 located at the side wall exit 604). Specifically, the snaps 802 allow the vertical wire to be inserted through the opening 820. Thus, in some embodiments, the guard 800 is secured to the side wall 602 when the vertical wire is inserted through the snaps 802 and into the cavity 806. In some embodiments, the guard 800 can be secured by sliding the guard 800 onto the vertical wire in a direction parallel to the guard axis 816, toward the floor 610 of the cable tray 600. In some embodiments, the guard axis 816 is substantially perpendicular to a plane defined by the floor 610 when the guard 800 is secured to the cable tray 600, as shown in FIG. 17. In other embodiments, the guard axis 816 is substantially parallel to the plane defined by the floor 610 when the guard 800 is secured to the cable tray 600. For example, the guard axis 816 may be substantially parallel to the plane defined by the floor 610 when the guard 800 is secured to the cable tray 600 if the guard 800 is secured to the longitudinal wire 612 of the floor 610.

In some embodiments, the guard 800 may be installed on a longitudinal wire of the floor 610, where the longitudinal wire is proximate the side wall 602. In such embodiments, when the exit adapter 300 is installed in the first orientation (see, e.g., FIG. 1A), the first channel 342 may be sized such that the guard 800 can be inserted in the first channel 342 in addition to the longitudinal wire of the floor 610. In such embodiments, when the exit adapter is installed in the second orientation (see, e.g., FIG. 1B), the second channel 346 may be sized such that the guard 800 can be inserted in the second channel 346 in addition to the longitudinal wire of the floor 610.

In some embodiments, the guard 800 is formed of pliable material such that the guard 800 does not interfere with the longitudinal wire 608 of the side wall 602. Specifically, the guard 800 may be formed of pliable material so the snaps 802 can deform to allow the longitudinal wires 608 of the side wall to be inserted through the opening 820 and into the cavity 806.

In II some embodiments, the guards 700, 800 can be formed through an extrusion process. In such a process, the guards 700, 800 may be extruded to an extrude length and cut to a predetermined length. In some embodiments, the guards 700, 800 can be formed through a molding process. In other embodiments, the guards 700, 800 can be formed via 3-D printing or any other form of additive manufacturing. In some embodiments, the guards 700, 800 is made of a flexible (e.g., pliable material). In some embodiments, the guards 700, 800 may include a relief, similar to the relief 508 of the guard 500.

It should be understood that the guards 500, 700, and 800 can be installed at any place on a cable tray in which a cut is made and edges of the wires are left exposed.

Thus, examples of the disclosed technology provide improved exit brackets, including as can selectively be installed on exit adapters, which can be selectively installed in different orientations to support vertically installed discrete cable tray sections therefrom.

As used herein, unless otherwise limited or specified, “substantially identical” refers to two or more components or systems that are manufactured or used according to the same process and specification, with variation between the components or systems that are within the limitations of acceptable tolerances for the relevant process and specification. For example, two components can be considered to be substantially identical if the components are manufactured according to the same standardized manufacturing steps, with the same materials, and within the same acceptable dimensional tolerances (e.g., as specified for a particular process or product).

Also as used herein, unless otherwise limited or defined, “substantially parallel” indicates a direction that is within ±12 degrees of a reference direction (e.g., within ±6 degrees or ±3 degrees), inclusive. Similarly, unless otherwise limited or defined, “substantially perpendicular” similarly indicates a direction that is within ±12 degrees of perpendicular a reference direction (e.g., within ±6 degrees or ±3 degrees), inclusive. Correspondingly, “substantially vertical” indicates a direction that is substantially parallel to the vertical direction, as defined relative to the reference system (e.g., a local direction of gravity, by default), with a similarly derived meaning for “substantially horizontal” (relative to the horizontal direction). Discussion of directions “transverse” to a reference direction indicate directions that are not substantially parallel to the reference direction. Correspondingly, some transverse directions may be perpendicular or substantially perpendicular to the relevant reference direction.

Also as used herein, discussion of an “entrance” direction or feature is presented relative to a cable passing from a cable tray onto a cable exit. This framing is adopted for clarity of discussion and is not intended to be limiting relative to particular cable routing operations. For example, those of skill in the art will recognize that whether cable is to be considered as “exiting” or “entering” a tray may vary, dependent on perspective or relative to particular installation operations (e.g., in which cable is actively routed from a cable tray onto an exit adapter, or vice versa). Correspondingly, unless otherwise indicated or required, it should be understood that reference to an “entrance” direction herein necessarily implies (and includes) a reversed perspective, in which an “exit” direction for cable extends opposite the described entrance direction.

Also as used herein, unless otherwise limited or defined, “or” indicates a non-exclusive list of components or operations that can be present in any variety of combinations, rather than an exclusive list of components that can be present only as alternatives to each other. For example, a list of “A, B, or C” indicates options of: A; B; C; A and B; A and C; B and C; and A, B, and C. Correspondingly, the term “or”

as used herein is intended to indicate exclusive alternatives only when preceded by terms of exclusivity, such as “only one of,” or “exactly one of.” For example, a list of “only one of A, B, or C” indicates options of: A, but not B and C; B, but not A and C; and C, but not A and B. In contrast, a list preceded by “one or more” (and variations thereon) and including “or” to separate listed elements indicates options of one or more of any or all of the listed elements. For example, the phrases “one or more of A, B, or C” and “at least one of A, B, or C” indicate options of: one or more A; one or more B; one or more C; one or more A and one or more B; one or more B and one or more C; one or more A and one or more C; and one or more A, one or more B, and one or more C. Similarly, a list preceded by “a plurality of” (and variations thereon) and including “or” to separate listed elements indicates options of one or more of each of multiple of the listed elements. For example, the phrases “a plurality of A, B, or C” and “two or more of A, B, or C” indicate options of: one or more A and one or more B; one or more B and one or more C; one or more A and one or more C; and one or more A, one or more B, and one or more C.

Also as used herein, unless otherwise limited or defined, “integral” and derivatives thereof (e.g., “integrally”) describe elements that are manufactured as a single piece without fasteners, adhesive, or the like to secure separate components together. For example, an element that is stamped, cast, or otherwise molded as a single-piece component from a single piece of sheet metal or using a single mold, without rivets, screws, other fasteners, or adhesive to hold separately formed pieces together is an integral (and integrally formed) element. In contrast, an element formed from multiple pieces that are separately formed initially then later connected together, is not an integral (or integrally formed) element.

In some implementations, devices or systems disclosed herein can be utilized, manufactured, installed, etc. using methods embodying aspects of the disclosed technology. Correspondingly, any description herein of particular features, capabilities, or intended purposes of a device or system should be considered to disclose, as examples of the disclosed technology a method of using such devices for the intended purposes, a method of otherwise implementing such capabilities, a method of manufacturing relevant components of such a device or system (or the device or system as a whole), and a method of installing disclosed (or otherwise known) components to support such purposes or capabilities. Similarly, unless otherwise indicated or limited, discussion herein of any method of manufacturing or using for a particular device or system, including installing the device or system, should be understood to disclose, as examples of the disclosed technology, the utilized features and implemented capabilities of such device or system.

Some methods of the disclosed technology may be presented above or below with operations listed in a particular order. Unless otherwise required or specified, the operations of such methods can be implemented in different orders, in parallel, or as selected sub-sets of one or more individual operations (e.g., with a particular listed operation being implemented alone, rather than in combination with others).

The previous description of the disclosed embodiments is provided to enable any person skilled in the art to make or use the disclosure. Various modifications to these embodiments will be readily apparent to those skilled in the art, and the generic principles defined herein may be applied to other embodiments without departing from the spirit or scope of the disclosure. Thus, the disclosure is not intended to be limited to the embodiments shown herein but is to be accorded the widest scope consistent with the principles and novel features disclosed herein.

We claim:

1. A system for supporting cables, the system comprising:

a first cable tray and a second cable tray, each of the first and second cable trays including a floor and side walls formed from longitudinal and transverse wires;

an exit adapter having a first end and a second end, and a ramp extending between the first end and the second end; and an exit bracket having a top end and a bottom end, and a lip that extends from the bottom end of the exit bracket to define a bracket channel that opens toward the top end of the exit bracket;

the exit adapter being securable to the first cable tray in a first orientation, with the first end below the second end, the exit bracket secured to the first end of the exit adapter, and the bracket channel opening upwardly to receive a transverse wire of the second cable tray so that the transverse wire of the second cable tray is supported by the lip within the bracket channel to hang the second cable tray from the first end of exit adapter via the exit bracket.

2. The system of claim 1, wherein the exit adapter further includes a first mating tab at the first end and a second mating tab at the second end;

wherein the exit bracket further includes a mating flange;

wherein, with the exit adapter secured to the first cable tray in the first orientation, the exit bracket is secured to the first mating tab of the exit adapter; and wherein the exit bracket is securable to the first cable tray in a second orientation, with the second end below the first end, the exit bracket secured to the second mating tab of the exit adapter, and the bracket channel receiving the transverse wire of the second cable tray to hang the second cable tray from the second end of the exit adapter.

3. The system of claim 2, wherein the first mating tab includes a notch;

wherein the mating flange includes a hook; and wherein with the exit adapter in the first orientation the hook is received into the notch to support the exit bracket vertically relative to the exit adapter.

4. The system of claim 1, wherein the bracket channel further receives transverse wires of the side walls of the second cable tray.

5. The system of claim 4, wherein the bracket channel is discontinuous, to receive longitudinal wires of the second cable tray.

6. The system of claim 5, wherein the exit bracket includes a first wall, a second wall, and a third wall that collectively define the bracket-channel; and wherein the first wall includes the lip, and the transverse wire of the second cable tray forms part of the floor of the second cable tray.

7. The system of claim 6, wherein the first wall includes the lip as a first lip at the bottom end of the exit bracket, the second wall includes a second lip at the bottom end of the exit bracket, and the third wall includes a third lip at the bottom end of the exit bracket; and wherein the bracket channel is collectively defined by the first, second, and third lips.

8. The system of claim 1, wherein the top end of the exit bracket includes a furled edge that extends above the bracket channel and aligns with the ramp at the first end of the exit adapter.

9. The system of claim 8, wherein the exit bracket includes a mating flange that extends from the furled edge, the mating flange being configured to secure the exit bracket to the first end of the exit adapter.

10. A method of supporting cables, the method comprising:

providing an exit adapter that includes a first end and a second end, and a ramp extending between the first end and the second end;

providing an exit bracket having a top end and a bottom end, and a lip that extends from the bottom end of the exit bracket to define a bracket channel that opens toward the top end of the exit bracket;

providing a first cable tray and a second cable tray, each of the first and second cable trays including a floor and side walls formed from longitudinal and transverse wires;

securing the exit adapter in a first orientation to the first cable tray, with the first end of the exit adapter below the second end;

securing the exit bracket to the first end of the exit adapter with the bracket channel of the exit adapter opening upwardly toward the first cable tray to receive a transverse wire of the second cable tray; and hanging the second cable tray from the first end of the exit adapter, via the exit bracket, with the transverse wire of the second cable tray received into the bracket channel to be supported by the lip within the bracket channel.

11. The method of claim 10, wherein the exit adapter is selectively securable to the first cable tray in either of:

the first orientation; and a second orientation, in which the second end of the exit adapter is below the first end, wherein the exit bracket is securable to the first cable tray via the exit adapter by securing the exit bracket to the second end of the exit adapter.

12. The system of claim 1, wherein the exit bracket defines a cable passage that receives the cables from the ramp of the exit adapter in the first orientation; and wherein the lip extends away from the cable passage to define the bracket channel outside of the cable passage.

13. The system of claim 1, wherein the exit bracket includes voids along the bracket channel to receive longitudinal wires of the second cable tray when the transverse wire of the second cable tray is received within the bracket channel.

14. The system of claim 13, wherein the voids are disposed between tabs that form the lip and at least two of the tabs include an aperture; and wherein the exit bracket further includes at least two apertures aligned with the apertures in the at least two tabs to receive fasteners therethrough, to retain the transverse wire within the bracket channel.

15. A system for supporting cables relative to a first cable tray and a second cable tray, each of the first and second cable trays including a floor and side walls formed from longitudinal and transverse wires, the system comprising:

an exit adapter having a first end and a second end, and a ramp extending between the first end and the second end; and an exit bracket having a top end and a bottom end, the exit bracket defining:

a cable passage through the exit bracket between the top and bottom ends; and a bracket channel that opens toward the top end of the exit bracket; and the exit adapter being securable to the first cable tray in a first orientation to receive cables from the first cable tray onto the ramp, with the first end below the second end, the exit bracket secured to the first end of the exit adapter to align the cable passage to receive the cables from the ramp of the exit adapter into the cable passage, and the bracket channel opening upwardly to receive a transverse wire of the second cable tray, so that the transverse wire of the second cable tray is supported within the bracket channel to hang the second cable tray from the first end of exit adapter via the exit bracket.

16. The system of claim 15, wherein the exit bracket includes one or more tabs extending away from the cable passage to define the bracket channel, so that the bracket channel supports the second cable tray outside of the cable passage.

17. The system of claim 16, wherein the one or more tabs form a lip that extends outside of the cable passage to define the bracket channel.

18. The system of claim 17, wherein the lip is a discontinuous lip, with voids configured to receive longitudinal wires of the second cable tray when the transverse wire of the second cable tray is supported within the bracket channel.

* * * * *